(12) United States Patent
Jones et al.

(10) Patent No.: US 10,592,537 B2
(45) Date of Patent: *Mar. 17, 2020

(54) ENTITY DISPLAY PRIORITY IN A DISTRIBUTED GEOGRAPHIC INFORMATION SYSTEM

(71) Applicant: Google LLC, Mountain View, CA (US)

(72) Inventors: Michael T. Jones, Los Altos, CA (US); Brian McClendon, Portola Valley, CA (US); Amin Charaniya, Milpitas, CA (US); Michael Ashbridge, Richmond, CA (US)

(73) Assignee: Google LLC, Mountain View, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 15/839,642

(22) Filed: Dec. 12, 2017

(65) Prior Publication Data

US 2018/0101548 A1  Apr. 12, 2018

Related U.S. Application Data

(63) Continuation of application No. 15/387,768, filed on Dec. 22, 2016, now Pat. No. 9,785,648, and a
(Continued)

(51) Int. Cl.
*G06F 17/30* (2006.01)
*G06F 16/29* (2019.01)
(Continued)

(52) U.S. Cl.
CPC ............ *G06F 16/29* (2019.01); *G06F 16/248* (2019.01); *G06F 16/24578* (2019.01);
(Continued)

(58) Field of Classification Search
CPC .................................................. G06F 16/9537
(Continued)

(56) References Cited

U.S. PATENT DOCUMENTS

| 4,972,319 A | 11/1990 | DeLorme |
| 5,051,928 A | 9/1991 | Gruthers |

(Continued)

FOREIGN PATENT DOCUMENTS

| CA | 2169421 | 11/1996 |
| EP | 0967556 | 12/1999 |

(Continued)

OTHER PUBLICATIONS

Azuma, "A Survey of Augmented Reality", In presence: Teleoperators and Virtual Environments, Aug. 1997, vol. 6, No. 4, pp. 355-385.

(Continued)

*Primary Examiner* — Baoquoc N To
(74) *Attorney, Agent, or Firm* — Dority & Manning, P.A.

(57) ABSTRACT

A system for ranking geospatial entities is described. In one embodiment, the system comprises an interface for receiving ranking data about a plurality of geospatial entities and an entity ranking module. The module uses a ranking mechanism to generate place ranks for the geospatial entities based on the ranking data. Ranked entity data generated by the entity ranking module is stored in a database. The entity ranking module may be configured to evaluate a plurality of diverse attributes to determine a total score for a geospatial entity. The entity ranking module may be configured to organize ranked entity data into placemark layers.

20 Claims, 5 Drawing Sheets

Related U.S. Application Data continuation of application No. 15/422,438, filed on Feb. 1, 2017, now Pat. No. 9,870,409, which is a continuation of application No. 15/387,768, filed on Dec. 22, 2016, now Pat. No. 9,785,648, which is a continuation of application No. 14/629,086, filed on Feb. 23, 2015, now Pat. No. 9,715,530, which is a continuation of application No. 14/089,755, filed on Nov. 26, 2013, now Pat. No. 8,965,884, which is a continuation of application No. 13/621,042, filed on Sep. 15, 2012, now Pat. No. 8,626,754, which is a continuation of application No. 13/030,101, filed on Feb. 17, 2011, now Pat. No. 8,290,942, which is a continuation of application No. 11/548,689, filed on Oct. 11, 2006, now Pat. No. 7,933,897.

(60) Provisional application No. 60/726,505, filed on Oct. 12, 2005.

(51) Int. Cl.
*G06F 16/248* (2019.01)
*G06F 16/28* (2019.01)
*G06F 16/44* (2019.01)
*G06F 16/2457* (2019.01)
*G06Q 30/02* (2012.01)

(52) U.S. Cl.
CPC .......... *G06F 16/288* (2019.01); *G06F 16/444* (2019.01); *G06Q 30/0205* (2013.01); *G06Q 30/0261* (2013.01)

(58) Field of Classification Search
USPC ................ 707/705, 706; 705/14.64; 701/409
See application file for complete search history.

(56) References Cited

U.S. PATENT DOCUMENTS

| | | | |
|---|---|---|---|
| 5,220,507 A | 6/1993 | Kirson | |
| 5,263,136 A | 11/1993 | DeAguiar et al. | |
| 5,272,638 A | 12/1993 | Martin et al. | |
| 5,307,419 A | 4/1994 | Tsujino et al. | |
| 5,341,463 A | 8/1994 | Wescott et al. | |
| 5,396,254 A | 3/1995 | Toshiyuki | |
| 5,398,188 A | 3/1995 | Maruyama | |
| 5,434,788 A | 7/1995 | Seymour et al. | |
| 5,490,285 A | 2/1996 | Ahlenius et al. | |
| 5,555,354 A | 9/1996 | Strasnick et al. | |
| 5,559,707 A * | 9/1996 | DeLorme ............... G01C 21/20 340/990 |
| 5,579,459 A | 11/1996 | Jennyc | |
| 5,613,051 A | 3/1997 | Iodice et al. | |
| 5,646,751 A | 7/1997 | Motamed | |
| 5,710,835 A | 1/1998 | Bradley | |
| 5,754,182 A | 5/1998 | Kobayashi | |
| 5,760,783 A | 6/1998 | Migdal et al. | |
| 5,802,492 A | 9/1998 | DeLorme et al. | |
| 5,822,123 A | 10/1998 | Davis et al. | |
| 5,848,373 A | 12/1998 | DeLorme et al. | |
| 5,864,337 A | 1/1999 | Marvin | |
| 5,902,347 A | 5/1999 | Backman et al. | |
| 5,910,805 A | 6/1999 | Hickey et al. | |
| 5,919,860 A | 7/1999 | Hoppe | |
| 5,933,100 A | 8/1999 | Golding | |
| 5,938,709 A | 8/1999 | Hale | |
| 6,002,809 A | 12/1999 | Feig et al. | |
| 6,021,371 A | 2/2000 | Fultz | |
| 6,021,372 A | 2/2000 | Harrington | |
| 6,028,550 A | 2/2000 | Froeberg et al. | |
| 6,031,963 A | 2/2000 | Kitamura et al. | |
| 6,054,990 A | 4/2000 | Tran | |
| 6,067,502 A | 5/2000 | Hayashida et al. | |
| 6,098,015 A | 8/2000 | Nimura et al. | |
| 6,100,897 A | 8/2000 | Mayer et al. | |
| 6,111,583 A | 8/2000 | Yaron et al. | |
| 6,144,338 A | 11/2000 | Davies | |
| 6,182,010 B1 | 1/2001 | Berstis | |
| 6,199,014 B1 | 3/2001 | Walker et al. | |
| 6,202,026 B1 | 3/2001 | Nimura et al. | |
| 6,208,934 B1 | 3/2001 | Bechtolsheim et al. | |
| 6,215,503 B1 | 4/2001 | Snyder et al. | |
| 6,222,557 B1 | 4/2001 | Pulley et al. | |
| 6,233,523 B1 | 5/2001 | Sood | |
| 6,247,019 B1 | 6/2001 | Davies | |
| 6,252,608 B1 | 6/2001 | Snyder et al. | |
| 6,262,741 B1 | 7/2001 | Davies | |
| 6,266,614 B1 | 7/2001 | Alumbaugh | |
| 6,278,432 B1 | 8/2001 | Ratnakar | |
| 6,278,938 B1 | 8/2001 | Alumbaugh | |
| 6,285,999 B1 | 9/2001 | Page | |
| 6,307,573 B1 | 10/2001 | Barros | |
| 6,308,133 B1 | 10/2001 | Loffert et al. | |
| 6,321,158 B1 | 11/2001 | Delorme et al. | |
| 6,331,869 B1 | 12/2001 | Furlan et al. | |
| 6,337,708 B1 | 1/2002 | Furlan et al. | |
| 6,346,938 B1 | 2/2002 | Chan et al. | |
| 6,388,684 B1 | 5/2002 | Iwamura et al. | |
| 6,392,646 B1 | 5/2002 | Yamrom et al. | |
| 6,404,906 B2 | 6/2002 | Bacus et al. | |
| 6,405,123 B1 | 6/2002 | Rennard et al. | |
| 6,421,053 B1 | 7/2002 | Johns et al. | |
| 6,452,596 B1 | 9/2002 | Gueziec et al. | |
| 6,473,691 B1 | 10/2002 | Winter et al. | |
| 6,489,955 B1 | 12/2002 | Newhall | |
| 6,496,189 B1 | 12/2002 | Yaron et al. | |
| 6,522,336 B1 | 2/2003 | Yuasa | |
| 6,575,776 B1 | 2/2003 | Xie et al. | |
| 6,538,656 B1 | 3/2003 | Cheung et al. | |
| 6,542,812 B1 | 4/2003 | Obradovich et al. | |
| 6,553,420 B1 | 4/2003 | Karger et al. | |
| 6,573,905 B1 | 6/2003 | MacInnis et al. | |
| 6,594,823 B1 | 7/2003 | Corbin | |
| 6,622,084 B2 | 9/2003 | Cardno et al. | |
| 6,622,087 B2 | 9/2003 | Anderson | |
| 6,622,090 B2 | 9/2003 | Lin | |
| 6,680,674 B1 | 1/2004 | Park | |
| 6,697,799 B1 | 2/2004 | Neal et al. | |
| 6,721,769 B1 | 4/2004 | Rappaport et al. | |
| 6,724,382 B2 | 4/2004 | Kenyon et al. | |
| 6,772,174 B1 | 8/2004 | Pettersson | |
| 6,799,176 B1 | 9/2004 | Page | |
| 6,826,472 B1 | 11/2004 | Kamei et al. | |
| 6,853,912 B2 | 2/2005 | Han | |
| 6,856,807 B1 | 2/2005 | Raith | |
| 6,915,205 B2 | 7/2005 | Kim et al. | |
| 6,957,237 B1 | 10/2005 | Traversat et al. | |
| 6,960,997 B2 | 11/2005 | Gieseke et al. | |
| 6,999,876 B2 | 2/2006 | Lambert et al. | |
| 7,031,838 B1 | 4/2006 | Young et al. | |
| 7,050,068 B1 | 5/2006 | Bastos et al. | |
| 7,053,830 B2 | 5/2006 | Krumm et al. | |
| 7,081,902 B1 | 7/2006 | Crow et al. | |
| 7,088,266 B2 | 8/2006 | Watanabe et al. | |
| 7,124,022 B2 | 10/2006 | Carmichael et al. | |
| 7,158,878 B2 | 1/2007 | Rasmussen et al. | |
| 7,173,546 B2 | 2/2007 | Gomi et al. | |
| 7,177,761 B2 | 2/2007 | Kaufman et al. | |
| 7,197,393 B2 | 3/2007 | Kim | |
| 7,222,306 B2 | 5/2007 | Kaasila et al. | |
| 7,225,207 B1 | 5/2007 | Ohazama et al. | |
| 7,256,732 B2 | 8/2007 | De Salas et al. | |
| 7,260,474 B1 | 8/2007 | Thayathil et al. | |
| 7,376,510 B1 | 5/2008 | Green | |
| 7,379,811 B2 | 5/2008 | Rasmussen et al. | |
| 7,451,041 B2 | 11/2008 | Laumeyer et al. | |
| 7,460,953 B2 | 12/2008 | Herbst et al. | |
| 7,516,129 B2 | 4/2009 | Risberg et al. | |
| 7,539,675 B2 | 5/2009 | Risberg et al. | |
| 7,542,882 B2 | 6/2009 | Agrawala et al. | |
| 7,565,240 B2 | 7/2009 | Toinizawo | |
| 7,602,379 B2 | 10/2009 | Lemon | |
| 7,826,472 B2 | 11/2010 | Kappes et al. | |

(56) References Cited

U.S. PATENT DOCUMENTS

| | | | |
|---|---|---|---|
| 9,213,461 B2 | 12/2015 | Eraker et al. | |
| 9,250,095 B2 * | 2/2016 | Oi | G06F 3/0482 |
| 2001/0030667 A1 | 10/2001 | Kelts | |
| 2001/0050999 A1 | 12/2001 | Bacus et al. | |
| 2002/0035451 A1 | 3/2002 | Rothermel | |
| 2002/0049742 A1 | 4/2002 | Chan et al. | |
| 2002/0055926 A1 | 5/2002 | Dan et al. | |
| 2002/0067353 A1 | 6/2002 | Kenyon et al. | |
| 2002/0067374 A1 | 6/2002 | Kenyon | |
| 2002/0067379 A1 | 6/2002 | Kenyon et al. | |
| 2002/0103597 A1 | 8/2002 | Takayama et al. | |
| 2002/0112237 A1 | 8/2002 | Kelts | |
| 2002/0113797 A1 | 8/2002 | Potter et al. | |
| 2002/0120396 A1 | 8/2002 | Boies et al. | |
| 2002/0123841 A1 | 9/2002 | Satoh et al. | |
| 2002/0128773 A1 | 9/2002 | Chowanic et al. | |
| 2002/0129014 A1 | 9/2002 | Kim et al. | |
| 2002/0156779 A1 | 10/2002 | Elliot et al. | |
| 2002/0159657 A1 | 10/2002 | DeLorme | |
| 2002/0163654 A1 | 11/2002 | Levantovsky | |
| 2002/0184043 A1 | 12/2002 | Lavorgna et al. | |
| 2003/0038845 A1 | 2/2003 | Okamura | |
| 2003/0046311 A1 | 3/2003 | Baidya et al. | |
| 2003/0060973 A1 | 3/2003 | Mathews et al. | |
| 2003/0074391 A1 | 4/2003 | Carter et al. | |
| 2003/0095135 A1 | 5/2003 | Kassila et al. | |
| 2003/0194057 A1 | 10/2003 | Dewaele | |
| 2003/0220734 A1 | 11/2003 | Harrison et al. | |
| 2004/0027258 A1 | 2/2004 | Pechatnikov et al. | |
| 2004/0039520 A1 | 2/2004 | Khavakh et al. | |
| 2004/0041805 A1 | 3/2004 | Hayano et al. | |
| 2004/0075660 A1 | 4/2004 | Liao et al. | |
| 2004/0078750 A1 | 4/2004 | Frank | |
| 2004/0098399 A1 | 5/2004 | Risberg et al. | |
| 2004/0105573 A1 | 6/2004 | Neumann et al. | |
| 2004/0122936 A1 | 6/2004 | Mizelle et al. | |
| 2004/0145599 A1 | 7/2004 | Taoka et al. | |
| 2004/0217980 A1 | 11/2004 | Radburn et al. | |
| 2004/0225437 A1 | 11/2004 | Endo et al. | |
| 2004/0243307 A1 | 12/2004 | Geelen | |
| 2005/0004903 A1 | 1/2005 | Tsuda | |
| 2005/0021415 A1 | 1/2005 | Desai | |
| 2005/0027705 A1 | 2/2005 | Sadri et al. | |
| 2005/0033511 A1 | 2/2005 | Pechatnikov et al. | |
| 2005/0065959 A1 | 3/2005 | Smith et al. | |
| 2005/0071741 A1 | 3/2005 | Acharya et al. | |
| 2005/0080786 A1 | 4/2005 | Fish et al. | |
| 2005/0091193 A1 | 4/2005 | Frank et al. | |
| 2005/0096849 A1 | 5/2005 | Sorrells | |
| 2005/0110789 A1 | 5/2005 | Le Ouay | |
| 2005/0122294 A1 | 6/2005 | Ben-David et al. | |
| 2005/0131634 A1 | 6/2005 | Ignatin | |
| 2005/0144592 A1 | 6/2005 | Below et al. | |
| 2005/0171686 A1 | 8/2005 | Davis | |
| 2005/0197894 A1 | 9/2005 | Fairbanks et al. | |
| 2005/0209944 A1 | 9/2005 | Ballow et al. | |
| 2005/0216186 A1 | 9/2005 | Dorfman et al. | |
| 2005/0232513 A1 | 10/2005 | Ritt et al. | |
| 2005/0251331 A1 | 11/2005 | Kreft | |
| 2005/0270311 A1 | 12/2005 | Rasmussen et al. | |
| 2005/0278311 A1 | 12/2005 | Moore et al. | |
| 2005/0278396 A1 | 12/2005 | Betts et al. | |
| 2005/0286493 A1 | 12/2005 | Angelhag | |
| 2006/0002590 A1 | 1/2006 | Borak | |
| 2006/0004512 A1 | 1/2006 | Herbst et al. | |
| 2006/0017562 A1 | 1/2006 | Bachelder | |
| 2006/0026067 A1 | 2/2006 | Nicholas et al. | |
| 2006/0041375 A1 | 2/2006 | Witmer et al. | |
| 2006/0041376 A1 | 2/2006 | Poppen et al. | |
| 2006/0047691 A1 | 3/2006 | Humphreys et al. | |
| 2006/0069504 A1 | 3/2006 | Bradley et al. | |
| 2006/0075442 A1 | 4/2006 | Meadow | |
| 2006/0080156 A1 | 4/2006 | Baughn et al. | |
| 2006/0085392 A1 | 4/2006 | Wang et al. | |
| 2006/0106944 A1 | 5/2006 | Shahine et al. | |
| 2006/0149742 A1 | 7/2006 | Egnor | |
| 2006/0173841 A1 | 8/2006 | Bill | |
| 2006/0190445 A1 | 8/2006 | Risberg et al. | |
| 2006/0200383 A1 | 9/2006 | Arutunian et al. | |
| 2006/0241859 A1 | 10/2006 | Kimchi et al. | |
| 2006/0271277 A1 | 11/2006 | Hu et al. | |
| 2006/0271281 A1 | 11/2006 | Ahn et al. | |
| 2006/0271286 A1 | 11/2006 | Rosenberg | |
| 2006/0288014 A1 | 12/2006 | Edwards et al. | |
| 2007/0010942 A1 | 1/2007 | Bill | |
| 2007/0011145 A1 | 1/2007 | Snyder | |
| 2007/0050128 A1 | 3/2007 | Lee et al. | |
| 2007/0080830 A1 | 4/2007 | Sacks | |
| 2007/0096945 A1 | 5/2007 | Rasmussen et al. | |
| 2007/0106468 A1 | 5/2007 | Eichenbaum et al. | |
| 2007/0112777 A1 | 5/2007 | Field et al. | |
| 2007/0116357 A1 | 5/2007 | Dewaele | |
| 2007/0123276 A1 | 5/2007 | Parker et al. | |
| 2007/0143265 A2 | 6/2007 | Risberg et al. | |
| 2007/0149214 A1 | 6/2007 | Walsh et al. | |
| 2007/0154067 A1 | 7/2007 | Laumeyer et al. | |
| 2007/0198182 A1 | 8/2007 | Singh | |
| 2007/0203643 A1 | 8/2007 | Ramaswamy et al. | |
| 2007/0225986 A1 | 9/2007 | Bowe et al. | |
| 2007/0139348 A1 | 10/2007 | Cheung | |
| 2008/0010262 A1 | 1/2008 | Frank | |
| 2008/0234752 A1 | 9/2008 | Dahners | |
| 2008/0248815 A1 * | 10/2008 | Busch | H04W 4/029 |
| | | | 455/456.5 |
| 2008/0262715 A1 * | 10/2008 | Geelen | G01C 21/3655 |
| | | | 701/533 |
| 2008/0288306 A1 | 11/2008 | MacIntyre et al. | |
| 2008/0313532 A1 | 12/2008 | Dames et al. | |
| 2009/0037103 A1 | 2/2009 | Herbst et al. | |
| 2011/0004591 A1 | 1/2011 | Chen | |
| 2011/0184945 A1 | 7/2011 | Das et al. | |
| 2012/0041675 A1 * | 2/2012 | Juliver | G06Q 10/08 |
| | | | 701/465 |
| 2012/0130796 A1 * | 5/2012 | Busch | G06Q 30/02 |
| | | | 705/14.36 |
| 2012/0290383 A1 * | 11/2012 | Busch | G06Q 30/02 |
| | | | 705/14.36 |
| 2012/0296512 A1 * | 11/2012 | Lee | B60K 6/48 |
| | | | 701/29.3 |
| 2013/0321392 A1 * | 12/2013 | van der Merwe | G01C 21/20 |
| | | | 345/419 |
| 2015/0134235 A1 * | 5/2015 | Shan | G01C 21/26 |
| | | | 701/409 |
| 2015/0309717 A1 * | 10/2015 | Sinaguinan | G06F 3/04847 |
| | | | 701/538 |
| 2017/0147607 A1 * | 5/2017 | Jones | G06Q 30/0205 |

FOREIGN PATENT DOCUMENTS

| | | |
|---|---|---|
| EP | 1193626 | 4/2002 |
| EP | 1203931 | 5/2002 |
| JP | 61-135270 | 6/1986 |
| JP | 2000-029448 | 1/2000 |
| JP | 2001-027876 | 1/2001 |
| JP | 2002-032280 | 1/2002 |
| JP | 2003-208597 | 7/2003 |
| JP | 2003-337823 | 11/2003 |
| JP | 2004-280659 | 10/2004 |
| JP | 2004-326712 | 11/2004 |
| JP | 2005-235144 | 9/2005 |
| KR | 2003-0000691 | 1/2008 |
| WO | WO 2000/039755 | 7/2000 |
| WO | WO 2001/046781 | 6/2001 |
| WO | WO 2007/021177 | 2/2007 |

OTHER PUBLICATIONS

Barclay et al., "The Microsoft TerraServer", Microsoft Research, Microsoft Corporation, Jun. 1998.
Bedard et al., "Supporting Multiple Representations with Spatial Databases Views Management and the Concept of VUEL", Joint Workshop on Multi-Scale Representations of Spatial Data, Jul. 7-8,

(56) References Cited

OTHER PUBLICATIONS

2002, ISPRS WG IV/3, ICA Com. On Map Generation, Ottawa, Canada, pp. 1-14.
Berneier et al., "UMapIt: An On-Demand Web Mapping Tool Based on a Multiple Representation Database", Eighth ICA Workshop on Generalisation and Multiple Representation, Jul. 708, 2005, A Coruna, Spain, pp. 1-9.
Brenner et al., "Extracting Landmarks for Car Navigation Systems Using Existing GIS Databases and Laser Scanning", ISPRS Archives, Sep. 2003, vol. XXXIV, Part 3/W8, 6 pages.
Burges et al., "Learning to Rank Using Gradient Descent", Proceedings of the $22^{nd}$ International Conference on Machine Learning, Bonn, Germany, 2005, pp. 1-8, [online].
Burnett, "'Turn Right at the King's Head' Drivers' Requirements for Route Guidance Information", A Doctoral Thesis of Loughborough University, Nov. 1998, http://dspace.mit.edu/handle/1721.1/14225, retrieved on Feb. 22, 2010, 341 pages.
Burnett, "'Turn Right at the Traffic Lights' The Requirement for Landmarks in Vehicle Navigation Systems", The Journal of Navigation, 2000, vol. 53, No. 3 pp. 499-510.
"Comparing Vector and Raster Mapping for Internet Applications", ESRI White Paper, Redlands, California, Aug. 2006, 10 pages.
Cosman, "Global Terrain Texture: Lowering the Cost", Proceedings of the 1994 Image VII Conference, Tempe, Arizona, The Image Society, pp. 53-64.
Crawford et al., "Fast 3D Visualization of Large Image Datasets in a GIS", Earth Observation Magazine, vol. 12, No. 9, Dec. 2003, pp. 1-5.
Davis, "The Back Seat Driver: Real Time Spoken Driving Instructions", Ultrasonics Symposium, Montreal, Quebec, Canada, Oct. 3-6, 1989, pp. 146-150.
Dragan, "MSN Virtual Earth 1.0" review by PC Magazine, Jul. 26, 2005, http://www.pcmag.com/article2/0.1895.1840750.00.asp., retrieved on Aug. 1, 2005, pp. 1-2.
Egenhofer et al., "Exploratory Access to Geographic Data Based on the Map-Overlay Metaphor", Journal of Visual Languages and Computing, vol. 4, No. 2 1993, pp. 105-125.
Egenhofer et al., "Visual Map-Algebra: A Direct-Manipulation User Interface for GIS", Visual Database Systems 3, Visual Information Management, proceedings of the Third IFIP 2.6 Working Conference on Visual Database Systems, Lausanne, Switzerland, Chapman & Hall, 1995, pp. 235-253.
"ESRI Video Clips, What is GIS?", Jul. 25, 2006, http://gis.esn.com/esriclips/clip.cfm?ClipID-60, retrieved on Jul. 25, 2006.
Ester et al., "Spatial Data Mining: A Database Approach", Proceedings of the Fifth International Symposium on Large Spatial Databases (SSD '97), 1997, Lecture Notes in Computer Science, Springer, Berlin, Germany, 20 pages.
Feiner et al., "Knowledge-Based Augmented Reality", Communications of the ACM, Jul. 993, vol. 36. No. 7, pp. 53-62.
Fraser et al., "Usability of Geospatial Metadata of Space—Time Matters", Bulletin of the American Society for information Science and Technology, Aug. 1999, vol. 25, No. 6, pp. 24-28.
Fukunaga et al., "Hitachi Group Initiatives as ITS Business Begin to Take Off," Hitachi Corporation, pp. 22-27.
"Geography Markup Language", Wikipedia, http://en.wikipedia.org/wiki/Geography_Markup_Language, retrieved on Oct. 23, 2007, 8 pages.
"Geo-Web, Markup and Geo-web, GML and KML Syntax", http://geoweb.blog.com/313918/, retrieved on Oct. 23, 2007, 10 pages.
Gleicher et al., "Through-the-Lens Camera Control", Conference on Computer Graphics, Chicago, Illinois, Jul. 26-31, 1992. pp. 331-340.
Ho et al., "Word Recognition with Multi-Level Contextual Knowledge", Center for Document Analysis and Recognition, State University of New York at Buffalo, Buffalo, New York, 11 pages.
Hauer et al., "Mobile Augmented Reality", Chapter 9, Telegeoinformatics: Location-Based Computing and Services, Taylor & Francis Books Ltd., Jan. 2004, pp. 221-260.

"Information Visualization: Visual Interfaces for Decision Support Systems", AVS Advanced Visual Systems, http://www.avs.com/white-papers/infoviz.html, retrieved on Aug. 28, 2006.
Leclerc et al., "TerraVision: A Terrain Visualization System", SRI International, Menlo Park, California, Tech. Note No. 540, Apr. 22, 1994.
MapQuest.Com Maps, Directions and More, www.mapques.com, retrieved on Aug. 1, 2005.
Meeks et al., "Geospatial Information Utility: An Estimation of the Relevance of Geospatial Information to Users", Jul. 25, 2003, pp. 47-63.
"Microsoft Streets & Trips 2001", answers.com, 1999, www.answers.com/topic.microsoft-streets-trips-2001, retrieved on May 29, 2009, 2 pages.
Montalbano, "Microsoft Takes on Google with Virtual Earth", IDG News Service, Jul. 25, 2005, www.infoworld.com/article/05/07/25/HNmsvirtualearth.sub.--1.html , retrieved on Aug. 1, 2005.
MSN Maps & Directions, http://maps.msn.com/(ogxuearj4ya5au55fogcdzbt)/Home.aspx, retrieved on Aug. 1, 2005.
MSN Virtual Earth—Microsoft Internet Explorer, http://virtualearth.msn.com, retrieved on Aug. 1. 2005, pp. 1-3.
MultiMap.com—Online Maps Everywhere, http://multimaps.com, Aug. 1, 2005.
NASA World Wind, http://worldwind.arc.nasa.gov, retrieved on Aug. 1, 2005, pp. 1-2.
Poslad et al., "Crumpet: Creation of User-Friendly Mobile Services Personalized for Tourism", Second International Conference on 3G Mobile Communication Technologies, Mar. 2001, London, United Kingdom, 5 pages.
Potmesil, "Maps Alive: Viewing Geospatial Information on the WWW", http://geckil.com/~harvest/www6/Technical/Paper130/Paper130 . . . , retrieved on Feb. 19, 2009.
Rabinovich et al., "Visualization of Large Terrains in Resource-Limited Computing Environments", Proceedings of the $8^{th}$ IEEE Visualization Conference, Oct. 2-24, 1997, Phoenix, Arizona, pp. 95-102.
Reitmayr et al., "Collaborative Augmented Reality for Outdoor Navigation and Information Browsing", Proceedings of the $2^{nd}$ Symposium on Location Based Services and TeleCartography, Vienna, Austria, Jan. 28-29, 2004, pp. 31-41.
Rekimoto et al., "The World Through the Computer: Computer Augmented Interaction with Real World Environments", Proceedings of the $8^{th}$ Annual ACM Symposium on User Interface Software and Technology, Pittsburgh, Pennsylvania, Nov. 15-17, 1995, pp. 29-36.
Metro et al., "A Syntactic and Lexicon Analyzer for the Geography Markup Language (GML)", Geoscience and Remote Sensing Symposium, Anchorage, Alaska, Sep. 20-24, 2004, pp. 2896-2899.
Richards et al., "A Comparison of Two Direct-Manipulation GIS User Interfaces for Map Overlay", Geographical Systems, vol. 2, No. 4, 1995, pp. 267-290.
Samet, "MARCO: Map Retrieval by Content", IEEE Transactions on Pattern Analysis and Machine Intelligence, vol. 18, No. 8, Aug. 1996, pp. 783-798.
Starner et al., "Augmented Reality Through Wearable Computing", MIT Media Laboratory Perceptual Computing Section Technical Report No. 397, 1997, pp. 1-9.
Sullivan. "MSN Virtual Earth to Take on Google Earth", http://blog.searchenginewatch.com/blog/050523-125208, retrieved on Aug. 1, 2005, pp. 1-4.
TerraServer—USA, http://terraserver.homeadvisor.msn.com, retrieved on Aug. 1, 2005.
Whereis.com—Search Australian Maps, http://www.whereis.com/whereis/home.jsp, retrieved Aug. 1, 2005.
Yahoo! Maps, Driving Directions, and Traffic, http://maps.yahoo.com, retrieved on Aug. 1, 2005.
Yamaichi, "We Can See Web Business Models of the Windows 2000 Era!" Backside of Exchange 2000 Café, www.exchange2000.com, BackOffice World, Vo. 3, Oct. 1, 2000. pp. 91-97.
Zhou et al., "On Spatial Information Retrieval and Database Generalization" International Conference on Digital Libraries: Research and Practice, Kyoto, Japan, Nov. 13-16, 2000, pp. 328-334.

(56) References Cited

OTHER PUBLICATIONS

Amendment and Response, U.S. Appl. No. 09/729,613, dated Oct. 2, 2003, 11 pages.
Office Action issued by Canadian Intellectual Property Office, Canadian Patent Application No. 2,560,560, dated Feb. 5, 2008, 3 pages.
Office Action issued by Canadian Intellectual Property Office, Canadian Patent Application No. 2,560,560, dated Mar. 18, 2009, 2 pages.
Office Action issued by Canadian Intellectual Property Office, Canadian Patent Application No. 2,560,560, dated Aug. 7, 2009, 3 pages.
Office Action issued by Canadian Intellectual Property Office, Canadian Patent Application No. 2,560,560, dated Jun. 23, 2009, 2 pages.
Office Action issued by the Canadian Intellectual Property Office, Canadian Patent Application No. 2,560,560, dated Oct. 29, 2007, 3 pages.
Office Action issued by Canadian Intellectual Property Office, Canadian Patent Application No. 2,625,651, dated Apr. 13, 2011, 6 pages.
First Office Action of China State Intellectual Property Office, Chinese Patent Application No. 200580013512.0, May 8, 2009, 11 pages.
Second Office Action of China State Intellectual Property Office, Chinese Patent Application No. 200580013512.0, dated Oct. 23, 2009, 8 pages.
First Office Action of China State Intellectual Property Office, Chinese Patent Application No. 200580013912.1, dated Aug. 28, 2009, 16 pages.
First Office Action of China State Intellectual Property Office, Chinese Patent Application No. 20680044327.2, dated Apr. 21, 2010, 10 pages.
Rejection Decision of China State Intellectual Property Office, Chinese Patent Application No. 200680044327.2, Dec. 26, 2007, 17 pages.
Notice of Grounds for Rejection, Japanese Patent Application No. P2007-505107, dated May 18, 2010, 6 pages.
Notice of Grounds for Rejection, Japanese Patent Application No, P2008-535780, dated Sep. 27, 2011, 8 pages.
Notice of Preliminary Rejection, Korean Patent Application No. KR 10-2008-7011184, dated Oct. 25, 2011, 7 pages.
Summons to Attend Oral Proceedings Pursuant to Rule 115(1) EPC for European Patent Application No. EP06826074.4, dated Oct. 27, 2010, 6 pages.
Supplementary European Search Report, European Patent Application No. 06826074.4, dated Oct. 31, 2008.
Supplementary European Search Report, European Patent Application No. EP 05726046.5, dated Nov. 6, 2008, 3 pages.
Examination Report for European Patent Application No. EP057026046.5, dated Apr. 23, 2010, 4 pages.
Supplementary European Search Report, European Patent Application No. EP 05729642.8, dated May 12, 2010, 5 pages.
Supplementary European Search Report for European Patent Application No. EP05713028, dated Sep. 6, 2010, 3 pages.
Communication Pursuant to Article 94(3) EPC, for European Application No. EP05729642.8, dated Oct. 8, 2010, 6 pages.
Communication from the Examiner for European Patent Application No. EP06826074.4, dated Jan. 3, 2011, 7 pages.
Indian Office Action, Indian Paternt Application No. 1237/MUMNP/2006, dated Nov. 13, 2007, 2 pages.
Indian Office Action, Indian Patent Application No. 1247/MUMNP/2006, dated Nov. 8, 2007, 2 pages.
PCT International Search Report and Written Opinion, PCT/US06/40480, dated Jun. 20, 2007, 7 pages.
PCT International Search Report and Written Opinion, PCT/US06/49400, dated Feb. 12, 2008, 9 pages.
PCT International Search Report and Written Opinion, PCT/US06/26745, dated Nov. 21, 2008, 7 pages.
PCT International Search Report and Written Opinion, PCT/US05/09538, dated Sep. 20, 2007, 7 pages.
PCT International Search Report and Written Opinion PCT/US04/41679, dated Nov. 29, 2005, 4 pages.
PCT International Search Report and Written Opinion, PCT/US05/03832, dated Dec. 14, 2006, 4 pages.
Office Action for U.S. Appl. No. 09/29,613, dated Jul. 2, 2003, 7 pages.
Office Action for U.S. Appl. No. 09/29,613, dated Nov. 26, 2003, 7 pages.
Office Action for U.S. Appl. No. 09/29,613, dated Sep. 15, 2013, 13 pages.
Office Action for U.S. Appl. No. 11/323,603, dated Jul. 29, 2009, 5 pages.
Office Action for U.S. Appl. No. 11/305,694, dated Dec. 3, 2009, 12 pages.
Office Action for U.S. Appl. No. 11/088,542, dated Dec. 3, 2008, 5 pages.
Office Action for U.S. Appl. No. 12/766,077, dated Jun. 18, 2010, 6 pages.
Office Action for U.S. Appl. No. 13/030,101, dated Oct. 6, 2011, 14 pages.
Office Action for U.S. Appl. No. 13/621,042, dated May 9, 2013, 7 pages.

\* cited by examiner

ENTITY DISPLAY PRIORITY IN A DISTRIBUTED GEOGRAPHIC INFORMATION SYSTEM

RELATED APPLICATION DATA

This application is a continuation of U.S. application Ser. No. 15/422,438 filed on Feb. 1, 2017, which is a continuation of U.S. application Ser. No. 15/387,768 filed on Dec. 22, 2016 (U.S. Pat. No. 9,785,648, issued on Oct. 10, 2017, which is a continuation of U.S. application Ser. No. 14/629, 086 filed on Feb. 23, 2015 (U.S. Pat. No. 9,715,530, issued on Jul. 25, 2017), which is a continuation of U.S. application Ser. No. 14/089,755, filed on Nov. 26, 2013 (U.S. Pat. No. 8,965,844 issued on Feb. 24, 2015), which is a continuation of U.S. application Ser. No. 13/621,042, filed on Sep. 15, 2012 (U.S. Pat. No. 8,626,754, issued on Jan. 7, 2014), which is a continuation of U.S. application Ser. No. 13/030, 101, filed on Feb. 17, 2011 (U.S. Pat. No. 8,290,942, issued on Oct. 16, 2012), which is a continuation of U.S. application Ser. No. 11/548,689, filed on Oct. 11, 2006 (U.S. Pat. No. 7,933,897, issued on Apr. 26, 2011), which claims the benefit of U.S. Provisional Application No. 60/726,505, filed on Oct. 12, 2005, which is hereby incorporated by reference in its entirety.

BACKGROUND

Field

The invention relates to mapping systems, and more particularly, to techniques for prioritizing geographical entities for placement on geographical displays.

Description of the Related Art

A geographic information system (GIS) is a system for archiving, retrieving, and manipulating data that has been stored and indexed according to the geographic coordinates of its elements. The system generally can utilize a variety of data types, such as imagery, maps, and tables. Historically, GIS technology has been used for scientific and governmental investigations (e.g., to identify geographical areas adversely impacted by pollution or over-building), resource management (e.g., regional forestry observation), and development planning (e.g., suburban development of under-utilized geographic areas).

More recently, GIS technology is being integrated into Internet-based mapping applications. Users can annotate digital map locations with placemarks (e.g., designated on the map with an icon or other graphic). Some placemarks allow the user to write a brief description relevant to the location marked by the placemark, while other placemarks allow the user to change the style of icons and/or labels associated with the placemark. However, in many instances, the number of available placemarks is significant.

What is needed, therefore, are techniques for prioritizing which placemarks (as well as other map entities) to display on a GIS-based map.

SUMMARY

The above need is met by techniques for generating prioritized entity data described herein.

In an embodiment, a geographic information system (GIS) comprises information about a plurality of geospatial entities and is configured to prioritize the geospatial entities according to a ranking mechanism. The ranking mechanism uses data about a meta attribute of a geospatial entity to determine the geospatial entity's priority. The meta attribute may vary in different implementations but in one embodiment comprises the quality of information available about a geospatial entity.

In another embodiment, a computer-implemented method can be used to rank geospatial entities. The method comprises several steps including receiving geospatial entity data, evaluating attributes of geospatial entities included in the received geospatial entity data, ranking the geospatial entities based on the evaluation, and storing the ranked geospatial entity data.

Another embodiment of the present invention provides one or more machine-readable mediums (e.g., one or more compact disks, diskettes, servers, memory sticks, or hard drives) encoded with instructions, that when executed by one or more processors, cause the one or more processors to carry out a process for ranking geospatial entities. This process can be, for example, similar to or a variation of the methodologies described herein.

Figure 1:
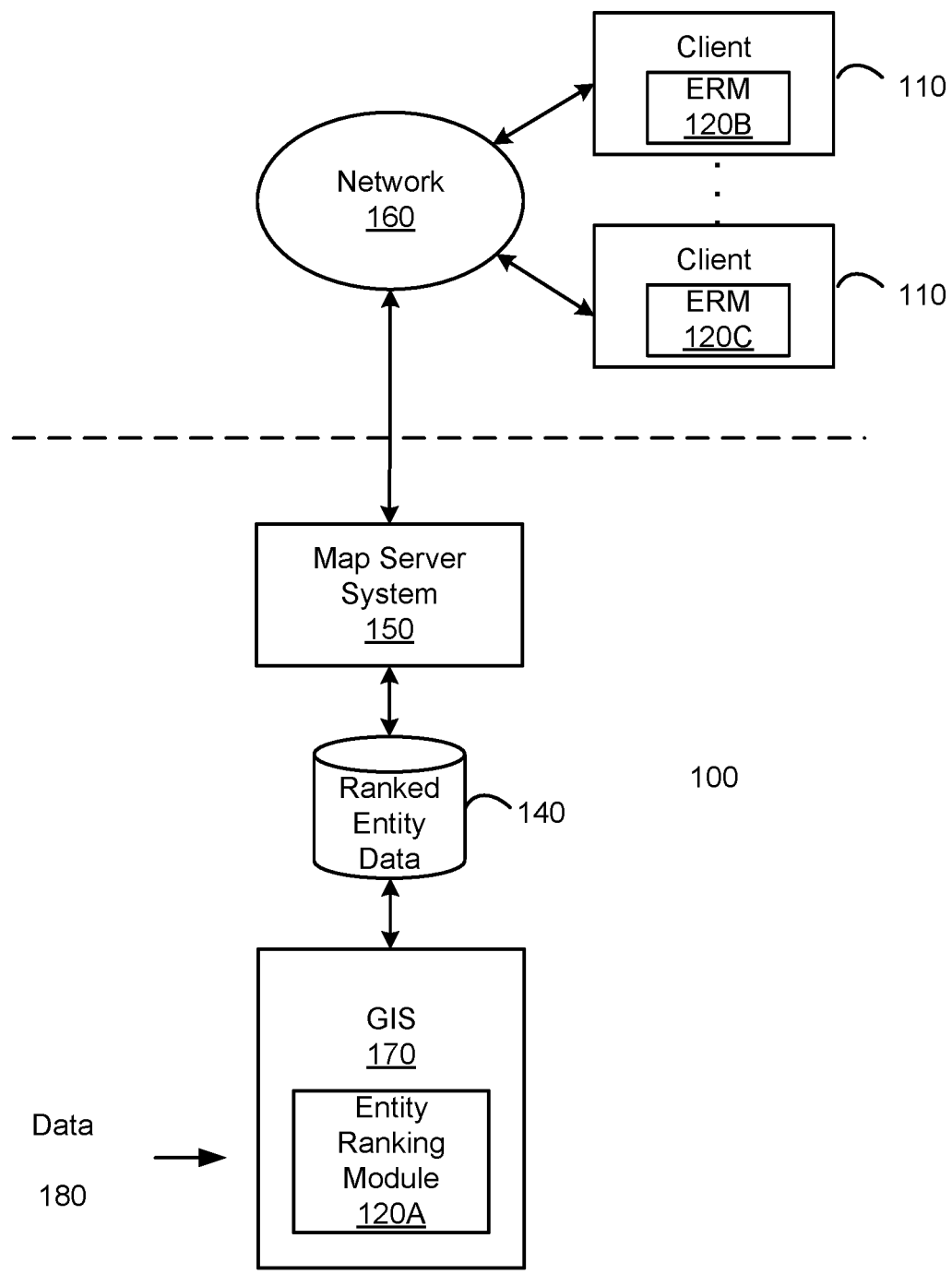
FIG. 1 is a block diagram of a GIS system with entity ranking capabilities in accordance with an embodiment of the invention.

The figures depict various embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

A geographic information system (GIS) is disclosed that provides users with a greater degree of flexibility, utility, and information. The system may also be configured as a distributed geographic information system (DGIS). The system employs techniques for prioritizing which placemarks (as well as other map entities) to display on a GIS-based map.

General Overview

It is common practice in Geographic Information Systems to provide mechanisms to select a subset of available geographic features for display based on any of several criteria. For example, one might load a database of world cities into such a system and then request to see only those cities within the United States, those cities with populations exceeding one million persons, or perhaps those cities meeting both of these criteria. In this last case, only the markers for New York City, Los Angeles, Chicago, Houston, Philadelphia, San Diego, Detroit, and Dallas would be displayed if 1990 population data were being used.

Further, some interactive Geographic Information Systems support different feature visibility criteria at different viewing distances. For example, a selection criteria might be constructed that would show only cities exceeding one million in population when the view was of the North American continent (viewing distance 1), then include additional cities exceeding 100,000 in population when the viewpoint is lowered to include a single state in the display area (viewing distance 2), and finally modified to include smaller cities as the view lowers within a state or county (viewing distance 3). These and related techniques are known in the GIS field as 'selection' and in the computer image generation field as 'visibility culling' and 'level of detail management'.

An embodiment of the present invention is configured to determine 'which few of many' geospatial items or entities to display on a map according to the relative importance of each entity according to its rank. Such a rank can be generated based on extrinsic factors, such as the popularity of the entity to users (e.g., quantity and/or velocity of geospatial item access), quality of information (e.g., respect for the information source of geospatial item and community stature of geospatial item's author), and similar meta-data about the geospatial feature. For example, if many users of an interactive GIS system view a particular small city (e.g., Henderson, Nev.), then an embodiment of the present invention would be to give that city a sufficiently significant place rank for display so as to display it along with the major cities exceeding one million in population. In this way users are shown the geospatial entities most likely to be of interest in the area of their visual search within an interactive geospatial information system. The ranking of geospatial items may further be based on location, distance, or other intrinsic attributes of a geospatial feature such as position and altitude (zoom level).

Although the ranking of geospatial entities is described herein primarily in the context of choosing entities for display to a user on a map, the ranking may be used for other purposes, as will be apparent in light of this disclosure. Examples include selecting which entities should have associated keywords used for determining and displaying relevant advertising; selecting which entities should be suggested as potential origins, destinations, or waypoints in navigation computations; and other uses where an estimation of a most popular or most interesting subset of geospatial entities is desired. In such applications, ranked entity data generated in accordance with an embodiment of the present invention may be supplied to various systems in addition to or instead of a digital mapping system as required by the context.

Using such entity ranking information, a two or three-dimensional digital map can be generated that includes placemarks that correspond to geospatial entities. In one such embodiment, a map generated by a GIS may include several types of data about geospatial entities. For instance, the map may include geographic features such as the terrain, infrastructure including roads, rail routes and airports, buildings, and/or borders of a landscape. The map may also be annotated with information about government entities and services such as parks and recreational services, federal, state, or local government landmarks, and community services. These and other annotations may be presented in the form of placemarks belonging to one or more categories, including commercial placemarks that represent businesses, travel placemarks including, for instance, historical sights and tourism destinations, user-defined placemarks that have been identified and named by a user for personal or community use, and/or community placemarks that have been voluntarily defined by members of the public in a forum. In one particular embodiment, information presented on a map is organized into collections that comprise layers, such as a terrain layer, road layer, border layer, community placemark layer, etc. Other layers include 'current events', 'history', and 'education', and indicate the organizational taxonomy of the source from which they were taken. A user can interact with a map and turn on or off various layers of information. In an embodiment, a basic or core layer is provided that includes a basic subset of data (for instance, the terrain, major roads, and political borders), and the user can select additional layers to customize the map view. Various third-party content-providers and advertisers can provide individual layers of data that can be overlaid onto such a basic map.

As will be understood in light of this disclosure, the placemark ranking methods described herein can be used in combination with any conventional, proprietary, and/or emerging techniques to generate a digital map. In the case of a conventional raster map, for instance, the placemarks and other types of map data are used to create a map in a digital format such as .jpeg, .gif, or .png, at a map server and then delivered to a client. Requests to manipulate or interact with the map, are provided from the client to the server, which in turn generates the requested map view. In the case of a tiled raster map, pre-generated, rasterized images or "tiles" that include placemark data are stored at a map server. When the user submits a map query, the rasterized images are provided to the client, where they are used to create the requested map. Additional views based on, for instance, panning, zooming, or tilting the requested map can be generated at the client using the tiles. Vector-based methods can also be used to generate digital maps in accordance with other embodiments of the invention. In one such particular case, map data, including placemark data, is provided to the client by a map server in the form of vector graphic instructions. The instructions are interpreted by an application at the client in real-time to generate a map for the user. As a user interacts with the map, for instance, by including or excluding various layers including geospatial entities, the map can be dynamically updated at the client to include those layers. Likewise, as the user interacts with the map, for instance, by zooming or panning, the map can be dynamically regenerated at the client to include the new map views.

Geographic information systems (GIS) are referred to throughout the present disclosure. As is known, a GIS may be implemented as a distributed geographic information system (DGIS), in which, for instance, GIS components are distributed across two or more different computers in different physical locations across a network such as the Internet or a corporate enterprise. Reference is also made herein to Google Earth, a GIS-based digital globe that includes various elements such as servers, clients, and other components and features as will be apparent in light of this disclosure. Reference is also made to Google Earth Community, a forum in which placemarks and entities are created, defined, described, and discussed by members of the participating public. Note that "Google Earth" and "Google Earth Community" and the descriptions provided herein may be protected under other forms of intellectual property, and are used for reference purposes only.

System Architecture

FIG. 1 is a high-level diagram of a digital map system 100 with entity ranking capabilities in accordance with an embodiment of the invention. The system 100 includes a map server system 150 that is communicatively coupled to one or more clients 110 via a network 160. The map server system 150 is coupled to a database 140 of ranked entity data populated (e.g., offline, or in real-time) by a GIS 170. The GIS 170 is equipped with an entity ranking module 120A that applies a ranking mechanism or algorithm to determine the relative ranks of geospatial entities. These entities may be defined within the GIS 170, for instance, based on data provided to the GIS 170 from various external sources 180. The ranked entities are stored in a database 140 and supplied to the map server system 150, which uses the ranked entity data to generate maps for clients 110. In the system 100 shown, client-side entity ranking modules 120B-C are also present for providing additional entity ranking functionality. For instance, in accordance with an alternative embodiment, the map server system 150 may provide the ranked entity data to clients 110 for client-side generation of maps and ranked entity data layers. Principles of heavy-client and light-client functionality equally apply here, as will be apparent in light of this disclosure.

Other modules may be included in the system, and illustrated modules may be rearranged and functionalities can be distributed. For instance, the GIS 170 can be integrated into the map server system 150. Similarly, the entity ranking module 120A of the GIS may be a standalone module. There may be a single entity ranking module 120A implemented wholly in or with the GIS system 100, without any entity ranking modules 120B-C on the client side 110. In another embodiment, entity ranking is implemented strictly by entity ranking modules 120B-C at clients 110. Other configurations will be apparent in light of this disclosure, and the present invention is not intended to be limited to any particular one. In this example, the term "module" refers to computer program logic or software for providing the specified functionality. When utilized by a client device 120 or map server system 150, a module may be loaded into memory and executed on a processor. In other embodiments, a module can be implemented in hardware (e.g., gate-level logic), firmware (e.g., a microcontroller with embedded routines for carrying out entity ranking as discussed herein), software, or some combination of hardware, firmware, and/or software.

The client 110 can be any device that allows a user to access the map server system 150 via the network 160. The client 110 may a device or system configured for computing, such as a personal computer or laptop, a mobile phone, a personal digital assistant, a smartphone, a navigation system located in a vehicle, or a handheld GPS system. Other clients 110 (not shown) may also be in communication with the map server system 150 via the network 160.

Each client 110 includes an application such as a browser that allows the user to interface and communicate with systems such as the map server system 150 on the network 160, as typically done. Examples of browsers include Microsoft's Internet Explorer browser, Netscape's Navigator browser, Mozilla's Firefox browser, PalmSource's Web Browser, or any other browsing or application software capable of communicating with network 160. Alternatively or in addition, the client 110 may include an application implemented outside of a browser, such as a specialized mapping or geographic application, from which data on the map server system 150 can be accessed. Interactions with the map server system 150 may be accomplished through a plug-in or other executable architecture implemented locally.

The GIS 170 can be configured with conventional technology, but further includes an entity ranking module 120A configured in accordance with the principles of the present invention. The GIS 170 receives data from various sources 180 upon which ranked entity data can be determined by the entity ranking module 120A. Both geospatial entities and ranking data by which the geospatial entities can be ranked are represented in the data. These types of data can be provided to the GIS 170 in structured and unstructured form. For instance, while entity data in the form of city names and geographies may be provided in a structured form, ranking data in the form of community comments or ratings, for instance, may be provided in unstructured form. Or, entity data and ranking data may be provided from the same structured source that, for example, identifies a city and its population, or an unstructured source such as a community bulletin board in which an entity is defined and data by which it can be ranked is provided.

The entity ranking capability of the map system 100 is provided by one or more entity ranking modules 120. The entity ranking module 120 collects entity data and ranking data with which the geospatial entities can be rated. This data may be provided from various sources including the GIS 170, external sources 180, and the client 110. These sources are described in further detail with reference to FIG. 2. The module 120 evaluates the geospatial entities using the ranking data in order to determine a score or rank for each of the entities. In an embodiment, the module 120 also associates the entities with placemarks for a map, and generates groupings or layers of placemarks based on, for instance, a certain placemark density or map view altitude. The resulting entities and entity layers can be stored in a ranked entity database 140, at a client 110, or elsewhere. Each of these capabilities will be described in further detail with reference to FIG. 2.

In a system that includes server 120A and client-side entity ranking modules 120B-C, the client-side modules 120B-C may provide complementary rankings for use in generating a map for a client 110. In one such embodiment, a server-side entity ranking module 120A provides general placemarks whose rank is determined by a set of general ranking data, while a client-side entity ranking module 120B-C provides personal placemarks that have been ranked using personal data about a user, their behavior, or their preferences.

The network 160 may be any type of communications network, such as a local area network (e.g., intranet), wide area network (e.g., internet), or some combination thereof. Alternatively, the network 160 may be a direct connection between the client 110 and the map server system 150. In general, the client 110, network 160, and/or map server system 150 may be in communication via any type of wired or wireless connection, using a wide variety of communication protocols.

The map server system 150 can be implemented with conventional or custom technology. Numerous known server architecture and functionalities can be used to implement a GIS server system. Further, the map server system 150 may include one or more servers operating under a load balancing scheme, with each server (or a combination of servers) configured to respond to and interact with clients 110 via the network 160. In one particular embodiment, the server system 150 is implemented as discussed in U.S. application Ser. No. 10/270,272, filed Oct. 10, 2002, titled "Server for Geospatially Organized Flat File Data," which is incorporated herein.

In general, when a user of a client computer 110 enters a search query (e.g., via browser and client side agent), it is put into a request by the client 110, and sent to the map server system 150 via the network 160. The server system 160 then determines what the search query is for, and responds with appropriate data from various sub-systems, such as geo-coders, routing engines, and local search indexes, in a format that the requesting client can use to present the data to the user (e.g., via a browser or other application).

Used in conjunction with the server system 150, the GIS 170 and ranked entity database 140 provide a map system 100 that serves map and GIS data over the Internet or other network 160. The map system 100 allows users to visualize, select, and explore geographic information (e.g., all over the world or in a particular region). The entity ranking module 120A can be configured to place rank available map data items based on various attributes associated with each geospatial feature (or a subdsdscset of geospatial features). These attributes may be extrinsic or intrinsic attributes of a geospatial feature, represent meta attributes of the feature, and/or reflect the personal behavior of a user. Based on ranking entities according to these attributes, users are shown the geospatial entities most likely to be of interest in the area of their visual search within the interactive GIS.

Entity Ranking Module

Figure 2:
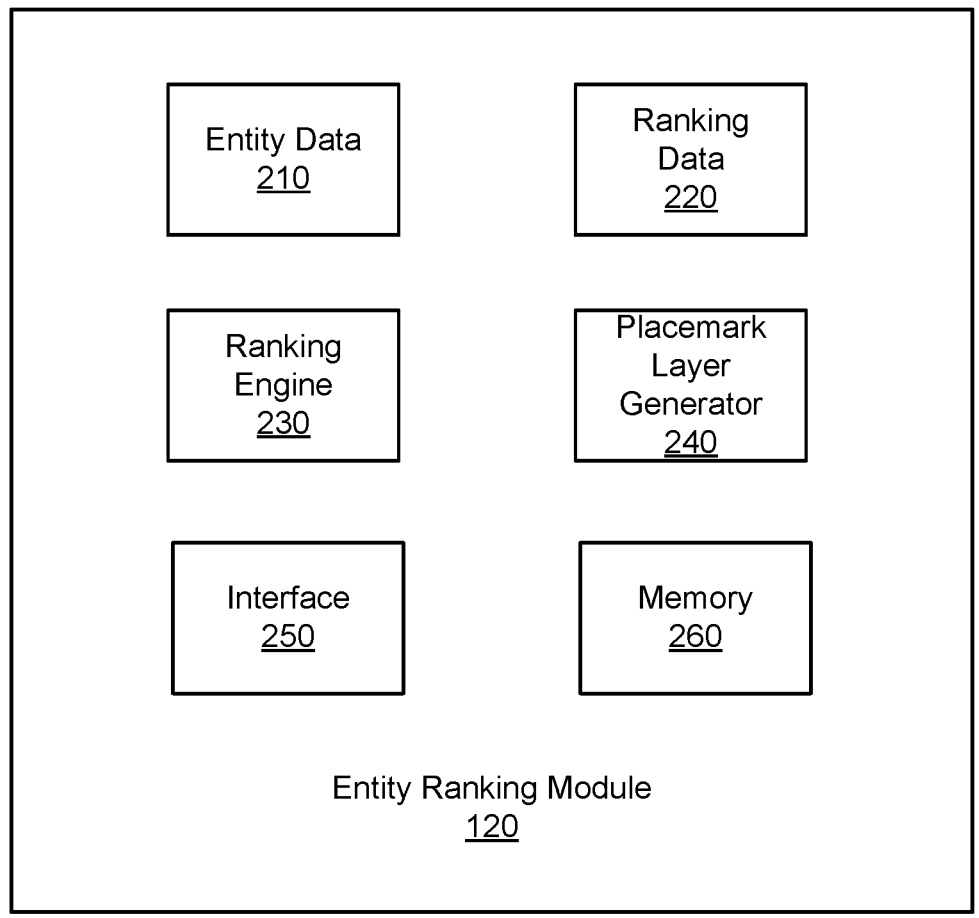
FIG. 2 is a block diagram of the entity ranking module shown in FIG. 1, according to one embodiment of the present invention.

FIG. 2 is a high-level block diagram of an entity ranking module 120 that could be implemented at a client computer or server-side GIS according to one embodiment of the present invention. The entity ranking module 120 receives or collects data from various sources about geospatial entities through an interface 250. The data contains both entity data 210 that identifies and defines geospatial entities and ranking data 220 by which geospatial entities can be evaluated. The entity data 210 may comprise placemark-level data. The ranking engine 230 applies one or more ranking algorithms or rank mechanisms to the ranking data 220 to determine scores for geospatial entities defined in the entity data 210. The resulting ranked entity data may be provided through the interface 250 to a requesting application such as a mapping application. Or, the ranked entity data can be formed into placemark layers by a placemark layer generator 240. In whatever form, the ranked entity data is stored and provided to a map server system or other application. The entity ranking module 120 includes a memory 260 in which data collected, including from a client, can be stored.

The entity ranking module 120 can receive entity data 210 and ranking data 220 about entities from any number of sources. The data may include satellite data, aerial photographs, street-level photographs, digital map data, tabular data (e.g., digital yellow and white pages), and targeted database data (e.g., databases of diners, restaurants, museums, and/or schools; databases of seismic activity; database of national monuments; etc). It may also include government census and population data, building plan data, demographic data including socio-economic attributes associated with a geospatial entity such as a zip code or town, and alternative name data. In one particular embodiment, the data comprises proprietary content collected by a third-party provider and placemarks derived from it can only be accessed by users who have specifically paid for or subscribed to it.

While these sources comprise structured data about geospatial entities, definitions of geospatial entities 210 and ranking data 220 in the form of information about attributes of geospatial entities may also be provided in unstructured form. Such data can be harvested from websites on the internet, and/or culled or provided from various sources including community forums such as the Google Earth Community, online bulletin boards, or other virtual spaces in which geospatial entities may be defined and described by users in a public, private, or semi-public setting. In the case of the Google Earth Community, for example, an entity may be posted by a user, and then descriptions of the entities may be provided on subsequent postings or replies to the initial posting. The entity ranking module 120 may also receive data from one or more clients 110 that may be particular to a user or client device 110. As described in more detail below, this data can be used to customize rankings and/or a user's experience.

Example geospatial entities include a city name and location, a user defined entity, a commercial entity, a geospatial item found in a web search, or any item (e.g., physical thing, event, or quality) having a geographic association. A geospatial entity is thus comprised of a geometry associated with a physical place (such as a set of geographic coordinates on Earth or the moon) and a description. In the case of a geospatial entity that is non-geographical in nature, such as the War of 1812, this geometry may correspond to locations associated with the event. Thus, the entity can correspond to single or multiple physical places and descriptions. For instance, geospatial entities in Google Earth can be either singleton objects or may be a hierarchical folder of objects, each object in which may be another folder or an entity. Thus, while some entities represent one geospatial object, other entities may have folders that in aggregate represent many geospatial objects. A single entity, in turn, may correspond to one or more placemarks. For instance, an entity like "Oakland gas stations" may include several different physical locations, each of which is represented by a separate placemark.

Ranking data 220 may describe attributes of entities that can be evaluated by the ranking engine 230 to determine the entity's rank. In an embodiment, the attribute defines the interestingness of an entity to a particular user. Such interestingness can be used to rank the various geospatial entities in the area of a user's visual search within an interactive geospatial information system (such as Google Earth), so that client-side entity display prioritizing is enabled. As will be explained in turn, "interestingness" for a geospatial entity can be determined by measuring or otherwise determining various types of extrinsic data associated with that entity. In one such embodiment, this measure, scaled by a corresponding weight, forms a bonus that augments the entity's score or rank (e.g., by addition or multiplication). Thus, higher ranked entities can be given priority for display over lower ranked (less interesting) entities. Data intrinsic to the GIS system may also be considered, as normally done (e.g., zoom level).

In another embodiment, ranking data 220 comprises various indications of a user's interest in certain placemarks. For instance, placemarks that have been saved or annotated by the user at the browser or application level could be deemed to be of greater interest to a user. A user's search terms or patterns of web page access or use may also be correlated to certain geospatial entities and used by an entity ranking module 120 at the client or on a server to select placemarks for the user. In addition, placemarks that the user has defined for his or her own use may be assumed to be of high personal interest. In one such embodiment, geospatial entities including points of interest or personal relevance to the user, such as the location of the user's house, workplace, child's daycare, or favorite playground are identified and marked on any map in the vicinity of these elements, regardless of their relative rank as calculated by a GIS. These and other indications of user interest may be gauged from the user's behavior, or may be in the form of preferences or instructions regarding entities affirmatively provided by the user, for instance instructing the inclusion or exclusion of specific entities or groups of entities in maps provided by a map server system. A rankings premium may be assigned to geospatial entities based on the user's interest or preferences. User data collected at a client may be stored in the memory 260 of the entity ranking module and used by the ranking engine 230 to generate entity rankings that are personal to the user.

The ranking engine 230 comprises a module for ranking entities based on descriptions of entity attributes included in the ranking data 220. Depending on the type of data provided, the ranking engine 230 can use a variety of mechanisms to evaluate geospatial entities, which are further described below.

The entities as ranked by the ranking engine 230 are organized into layers by a placemark layer generator 240. This may be accomplished by determining a level of detail and threshold to be associated, for instance, with a given altitude or density. For instance, when a user's query implicates a number of entities greater than a given threshold, only those entities having a place rank above a certain threshold are provided. For example, assume the given threshold for the total number of entities that can be displayed at the current map view is 50, and that the place rank threshold is 80. If a user's query implicates over 100 geospatial entities, and 35 entities have a place rank over 80, then the server system will serve those 35 entities along with the 15 next highest ranked entities for display at the requesting client. Alternatively, all of the implicated geospatial entities generated are served to a client-side entity ranking module 120, which then determines which of those entities to display (in a similar fashion to the server-side functionality). Or, both server-side and client-side entity ranking can be carried out, where the server system serves a set of ranked entities, and a client then displays a subset of that served set. Placemarks can be subdivided into layers according to criteria other than altitude or density, including conceptual, spatial, temporal, or other groupings. In one particular embodiment, the placemark layer generator also applies stylings to the various placemarks and stores those with the placemark layers.

Ranking Mechanisms

One embodiment of the present invention is a method for computing a relative ranking of a geospatial entity such as a city name and location, user defined entity, commercial entity, or geospatial item found in a web search, as compared to other such entities. These relative rankings are determined by a ranking engine 230 and are used within a GIS (e.g., as discussed with reference to client-side entity ranking of FIG. 1) to order the display of entities when not all can be selected for display, for example, to show some of the highest or lowest ranked entities, or perhaps a selected range of entities.

In an embodiment, this ranking, which can be referred to as place rank, is computed based on the weighted contributions of various non-cartographic meta attributes about a geospatial entity. Rather than directly measuring a characteristic of a physical place, such as its population, these attributes reflect traits of abstractions or representations associated with the geospatial entity. Examples include an attribute of a description of an entity (for instance, the amount of detail in the description of an entity or the number of times a description has been viewed), an attribute of a definition of an entity (e.g. the context or downloads of a definition of an entity, or attributes about the creation of an entity in a public forum), an indicator of the popularity of a geospatial entity (such as the number of views, downloads, or clicks on the entity or a placemark associated with the entity or an attribute based on a ranking or score assigned to an entity), or the relationship of an entity to its context, such as the category to which an entity belongs. Attributes that fit into each of these categories are described in greater detail below:

The amount of detail in the description of an entity. Longer descriptions are given a greater score than shorter descriptions, based on the presumption that more words means more information. In one embodiment of the ranking system described herein, this bonus (increased score) is based on the number of characters in the description text irrespective of the number of bytes required to represent that character in a chosen alphabetic encoding (e.g., thereby normalizing for languages that require more data to encode). A detail penalty can be assessed when the description size is less than a selectable threshold as a means to down-weight "empty" or "signature only" texts.

The number of entities created by a particular author or source. Sources that provide many entities are presumed more reliable than sources having created few entities. The rank bonus here rewards effort and experience and applies to user created entities (places or objects defined by users) as well as those taken from larger databases and from commercial vendors.

The context of a publicly posted geospatial entity. Some geospatial entities originate in public forums (such as the Google Earth Community), and through this origination become associated with the context of that forum (e.g., social life in Rome). Since the context of the user's search is also known, an embodiment of the ranking system described herein gives a rank bonus to entities posted in forums having a common or similar context with the user.

The number of replies to a publicly posted geospatial entity. Some geospatial entities originate in public forums (such as the Google Earth Community) and in this context there is a potential for dialog about such an entity, where some post to a forum is the specification of the entity and subsequent posts are replies to that entity specification post with discussion or additional information. In these cases, an entity can be credited with a rank bonus based on the number of replies. The replies can be selectively counted, either automatically or manually by a moderator, in order to avoid counting non-relevant replies (e.g., off-topic, flames, or the like).

The number of views of a publicly posted geospatial entity. Some geospatial entities originate in public forums (such as the Google Earth Community) and in this context there is a potential for readers of these forums to view some such posts more frequently than others. Since the frequency of viewing (or similarly actions, such as repeat viewing or bookmarking) reflects an interest in the item, an embodiment of the ranking system described herein gives a rank bonus to entities based on the number of views to the web page where the entity is described. When considered temporally, the incidence of entity views may have occurred non-uniformly over time, such as the case with a publicity spike attending an entity associated with a natural disaster. In such cases it may be preferable, for example, to consider 1000 views spread broadly over a sample interval as indicating greater interest, rather than considering 900 views in a short interval followed by 100 views over a longer interval. To reflect this variation in level of interest, an embodiment of the ranking system described herein allows the number of views to be optionally considered as a time series and apply statistical measures to analyze the distribution of interest. In one such embodiment, the entity rank bonus is greater for distributions that are even than those that are uneven, though the choice of a negative value as the weight for this bonus will effectively invert the class of distribution considered most interesting.

The number of downloads of a publicly posted geospatial entity. Some geospatial entities originate in public forums (such as the Google Earth Community) and in this context there is a potential for readers of these forums to download entity data from some such posts more frequently than others. Since the frequency of downloading (e.g., user click-through to the entity) reflects a deep interest in the item, an embodiment of the ranking system described herein gives a rank bonus to entities based on the number times an entity is downloaded. When considered temporally, the incidence of entity downloads may have occurred non-uniformly over time, such as the case with a publicity spike attending an entity associated with a natural disaster. In such cases it may be preferable, for example, to consider 1000 downloads spread broadly over a sample interval as indicating greater interest, rather than considering 900 downloads in a short interval followed by 100 downloads over a longer interval. To reflect this variation in level of interest, an embodiment of the ranking system described herein allows the number of downloads to be optionally considered as a time series and apply statistical measures to analyze the distribution of interest. In one such embodiment, the entity rank bonus is greater for distributions that are even than those that are uneven, though the choice of a negative value as the weight for this bonus will effectively invert the class of distribution considered most interesting.

The community stature of the author a publicly posted geospatial entity. Some geospatial entities originate in public forums (such as the Google Earth Community) and in this context there is an identified author for each entity. In these forums the authors may have a community stature or status based on number of posts, quality of posts as perceived by readers of those forums, common knowledge of an author's stature, membership level (e.g., moderator, member, paid member, guest, etc.), and similar factors. An embodiment of the ranking system described herein gives a rank bonus to entities based on the stature of its author within such an online community.

The number of entities contained within a multiple entity ensemble. For instance, geospatial entities in Google Earth can be either singleton objects or may be a hierarchical folder of objects, each object in which may be another folder or an entity. Due to this, some entities represent one geospatial object while other entities may have folders that in aggregate represent many geospatial objects. An embodiment of the ranking system described herein gives a rank bonus to aggregated collections since they contain more information. The bonus can be based, for example, on the total number of locations in the entity (e.g., bonus=5 if 5 locations; bonus=7 if 10 locations; bonus=10 if 15 locations; and bonus=15 if 20 or more locations). A further embodiment of the ranking system described herein assigns a greater rank bonus to multiple entity ensembles when they have more internal folders rather than less internal folders. This reflects the perception that entities with a detailed segmentation using folders are likely to be more detailed in other aspects as well. In practice, this bonus is computed based on the number of folders contained within a multiple entity ensemble, either proportionally to the number of folders or in a segmented manner (e.g., bonus=5 if 5 folders; bonus=7 if 10 folders; bonus=10 if 15 folders; and bonus=15 if 20 or more folders).

The relative age of an entity definition. Some geospatial entities originate in public forums (such as the Google Earth Community) and in this context there is an identified creation date for each entity. When two or more entities are similar in location they likely describe related information. To establish a further refined ranking score for such cases, an embodiment of the ranking system described herein gives a rank bonus to the older post as an encouragement for users to create entities defining new information rather than revisiting previously described locations. In another embodiment, newer data receives a higher rank because it reflects fresher and more current information.

The hierarchical importance of an entity. Some geospatial entities originate in public forums (such as the Google Earth Community) and in this context there is a potential parent-child relationship for the post that defines an entity. A parent post, such as "universities in Kansas" may have several child posts (known as replies) that supply geospatial entities defining each university within the state of Kansas. The parent post, perhaps describing the location of the main administrative office of the Kansas university system, might have an individual score lower than that of its children, which identify schools attended by many thousands of individuals. To direct attention to the parent post in such cases, an embodiment of the ranking system described herein assigns a rank bonus equal to the sum of the scores of any replies to each post. The ranking is thus based on the relationship of a geospatial entity to its place in a hierarchy of geospatial entities. This assures that the initiating parent post's score is greater than or equal to the sum of its parts. Other aggregation functions may also be used.

The relative importance of an entity category or source of an entity category. Some geospatial entities originate in public forums (such as the Google Earth Community) and in this context there are divisions known as 'forums', within one of which the post that defines an entity will be located. Forums are typically topical; examples include 'current events,' 'history,' and 'education.' The importance of these forums is not necessarily uniform. For example, 'current events' entities may be less important over time than 'history' entities, which are timeless. This situation is captured in an embodiment of the ranking system described herein by assigning an importance to each source of entities, or categories of entities, for instance, per forum for the Google Earth Community (or other interactive GIS), by vendor for commercial entity data, and similarly for other sources of entity data such as discovery by web search (e.g., low importance) or from official government sources (e.g., high importance). This relative source importance factor scales (e.g., multiplies) the overall score computed for an entity.

The externally-ranked importance of an entity. Some geospatial entities originate in public forums (such as the Google Earth Community) and in this context there may be a score or rank associated with that entity. In the Google Earth Community Forum, for example, each ranked post may have from one to five "stars," where five stars indicates a well-respected or otherwise highly regarded entity and one star corresponds to a poor or perhaps less respected entity. The metrics used to determine these external rankings are not necessarily uniform across multiple entity sources, so for example the entities from a Google Earth forum might have originating scores ranging from one to five stars, while geospatial entities found at a restaurant review website might be rated with zero to four "forks." Further, not only are such metrics as "stars" and "forks" not directly compatible in origin and range, the sources of these metrics may have varying degrees of reliability. For example, on source might be a public website with anonymous contributions and ratings while the other might be a professionally-created restaurant or tourist guide reporting refereed evaluations. For these reasons, the method by which an embodiment of the ranking system described herein incorporates such data is prefixed with an initial scale (A) and offset (B) transformation (e.g., NEW=A*OLD+B) before the subsequent weighting process (e.g., AttributeScore=Weight*[NEW]). For example, if a stars-based rating scheme goes from 1 to 5 (i.e, 0% to 100% satisfaction) and a forks-based scheme goes from 0 to 4 (i.e., 0% to 100% satisfaction), then the ratings cannot be compared or processed just by multiplying, since they start at a different values (1 vs. 0). One technique for handling this case of diverse rating systems is to take the entity source's native range (Low . . . High) and compute the following: Resealed=(NativeValue−Low)/(High−Low). This maps any range into 0 as low and 1 as high. Then, the result (Resealed) can be multiplied by a weighting factor (e.g., 100) to allow the entity to gain from 0 to 100 points of rank bonus as the native ranking moves from 1 . . . 5 stars or 0 . . . 4 forks. The values of Low and High are constant for each entity source (Forks, Stars, etc). Using algebra, the resealing equation can be reordered as: Resealed=[1/(High−Low)]*NativeValue+[Low/(Low−High)] or, A=1/(High−Low) and B=Low/(Low−High). It follows then that Resealed=A*Native+B. The entity score can then be augmented by WeightForThisAttribute*Rescaled (for each entity obtained from that source). One extension of such an embodiment uses the place ranking computed for an entity by the place rank process described herein to update the external-rank provided at the source where the entity was originally located, which could be for example the Google Earth Community Forums or other GIS forums.

The spatial density of entities in a defined neighborhood. When multiple entities are clustered in a relatively small geographical region, this signifies that authors of the entities have indicated a geographical region of elevated interest. From this it can be assumed that an entity with an elevated density of neighboring entities has a greater value than would otherwise be the case. This is implemented in an embodiment of the ranking system described herein by adding or otherwise providing a rank bonus based on the number of other entities within a defined area that includes an entity's location (e.g., circle or box centered at an entity's location). Note that this metric, though geospatial in concept, is not an inherent attribute of an entity but rather an observation of that entity in relation to other entities.

The click-through rate of displayed entities. When entities are displayed in an interactive GIS such as Google Earth, it is possible to track the number of instances where users further investigate an entity by various means such as clicking on it with a mouse operation, by performing operations on that entity such as selection or highlighting; by using that entity as a routing origin, destination, or waypoint; or by finding that entity to be responsive to a search for information (e.g., as when the entity description contains the word "Pizza" and a user of the interactive system performs a search with the keyword "Pizza", "Italian", or "Food"). A tabulation of such events yields a direct measure of importance for that entity as understood by users of the system. When this data is collected (e.g., in the optional client entity ranking module and/or in the server-side entity ranking module) it may be used as an attribute defining interestingness for an entity. An embodiment of the ranking system described herein exploits this measured activity level by assigning a rank bonus to an entity based on the number of user events it receives compared to the average value for other entities. This measure (e.g., scaled by the corresponding weight) forms a bonus added (e.g., or otherwise used) to augment an entity's score.

The enablement rate of entity categories. When entities are displayed in an interactive GIS such as Google Earth, they are often presented in the form of layers, as described earlier. These layers are selectable individually and in aggregate. The enablement of each layer can be viewed as a vote in a plurality voting system and the aggregation of such votes may be used to determine the relative preferences that users have for the various entity data layers. When this data is collected (e.g., in the optional client entity ranking module and/or in the server-side entity ranking module) it may be used as an attribute defining relative interestingness for a collection of entities. For example, a layer of "Bars and Night Clubs" will likely be enabled more often than a layer of state "IRS Offices". An embodiment of the ranking system described herein exploits this measured activity level by assigning a relative weighting for a class of entities or source of entities based on the number of layer selection actions observed compared to an average value. This measure can be used to set the relative importance of an entity category as previously discussed, or may be used to scale those static priorities by an additional amount based on empirical observation of user preferences.

The estimated importance of the web page or document associated with an entity. When an entity is linked from a web page or other electronic document, it is possible to use the estimated importance of that page or document to infer the estimated importance of the linked geospatial entity. One estimate of relative importance for online documents is a page rank, such as described in U.S. Pat. No. 6,285,999, titled "Method for Node Ranking in a Linked Database" and/or U.S. Pat. No. 6,799,176, titled "Method for Scoring Documents in a Linked Database" and/or U.S. Patent Application No. 20050071741, titled "Information Retrieval Based on Historical Data," each of which are hereby incorporated by reference herein. An embodiment of the ranking system described herein uses such page rank scores as a proxy score for geospatial entities referenced by online documents identified in a search result. For example, a Google search for "Kansas university"

returns 1,560,000 results, which are ordered by the page rank mechanism described in the '999 patent to display the ten results deemed most relevant as the initial response to the query. These first ten results are exactly those having the highest page rank score. An embodiment of the present invention uses one or more of search result document page rank scores, scaled by the corresponding weighting factor, as an importance bonus for geospatial entities referenced by those documents. For example, the top page rank score may be used, or the average of the top ten page rank scores, or some other function or selection thereof.

One or more of the attributes listed above is evaluated and the results are weighted individually with a scale factor before being summed to produce an overall score for an entity. Such a calculation could be performed by the ranking engine depicted in FIG. 2. In an embodiment, both meta attribute data about a geospatial entity and data that reflects attributes of the entity itself are used to determine the overall score. For instance, in an embodiment, the size of a business and the number of replies to a posting about the business are both factors that are weighed by a ranking engine 230. The ordering of entities by non-increasing score defines the ranking (descending order). The weighting factors can be changed based on resulting rankings to adjust the relative prominence of each attribute (e.g., automatically, or as desired by the system administrator, or by an individual user). In one embodiment, an end user can assign the weights to be applied to each type of attribute. Any of the weightings can be set to zero (or one in the case of relative importance) to remove that attribute from consideration or equivalently some of the attributes may be ignored. The weighting factors can be made negative to downgrade rather than reward entities for a particular attribute. Applying scale factors to individual attributes allows diverse attributes to be evaluated and a total score to be calculated based on the attributes.

Numerous algorithms can be used to for determine place rank in accordance with an embodiment of the present invention. For example, in an embodiment, SCORE=NumberOfPostCharacters+a*NumberOfDescriptionCharacters)+b*NumberOfReplies+c*NumberOfViews+d*NumberOfDownloads+StatureWithinCommunity, wherein a, b, c, and d represent variables that can be adjusted based on the value assigned to each attribute. The StatureWithinCommunity reflects the poster of a description, and, in an embodiment, can range from 200 to 500 depending on the poster's stature based on any of a number of criteria including reputation, posting behavior, and ratings or endorsements by other users.

One embodiment of the ranking system described herein aggregates the individual attribute measures with a general linear combination. A more sophisticated aggregation, of which the linear combination is the subset along the main diagonal, is to use an M by M matrix of weights, where the dimension M corresponds to the number of attributes, and matrix reduction is used to allow specification of weights for the full cross product of attributes. For example, such a technique allows a specified weight for the product of 'description length' and 'author stature' as a combined component. The two equation structures described herein are representative of the variety of attribute combination methods that will be apparent in light of this disclosure, such as including exponentiation or other algebraic forms in the evaluation of each attribute.

Thus, extrinsic meta data about a geospatial entity can be used as input to a scoring system that produces a relative ranking for purposes such as selection for display within a geospatial information system. There are other attributes that may be used in such a system, such as the degree of match between search terms and entity description text or historical search preferences of an individual user or users in aggregate, that may be incorporated into an interactive GIS as described herein as elements used to determine an entity score. Further, as described earlier, the ranking may be used for purposes other than selection for display.

Figure 3:
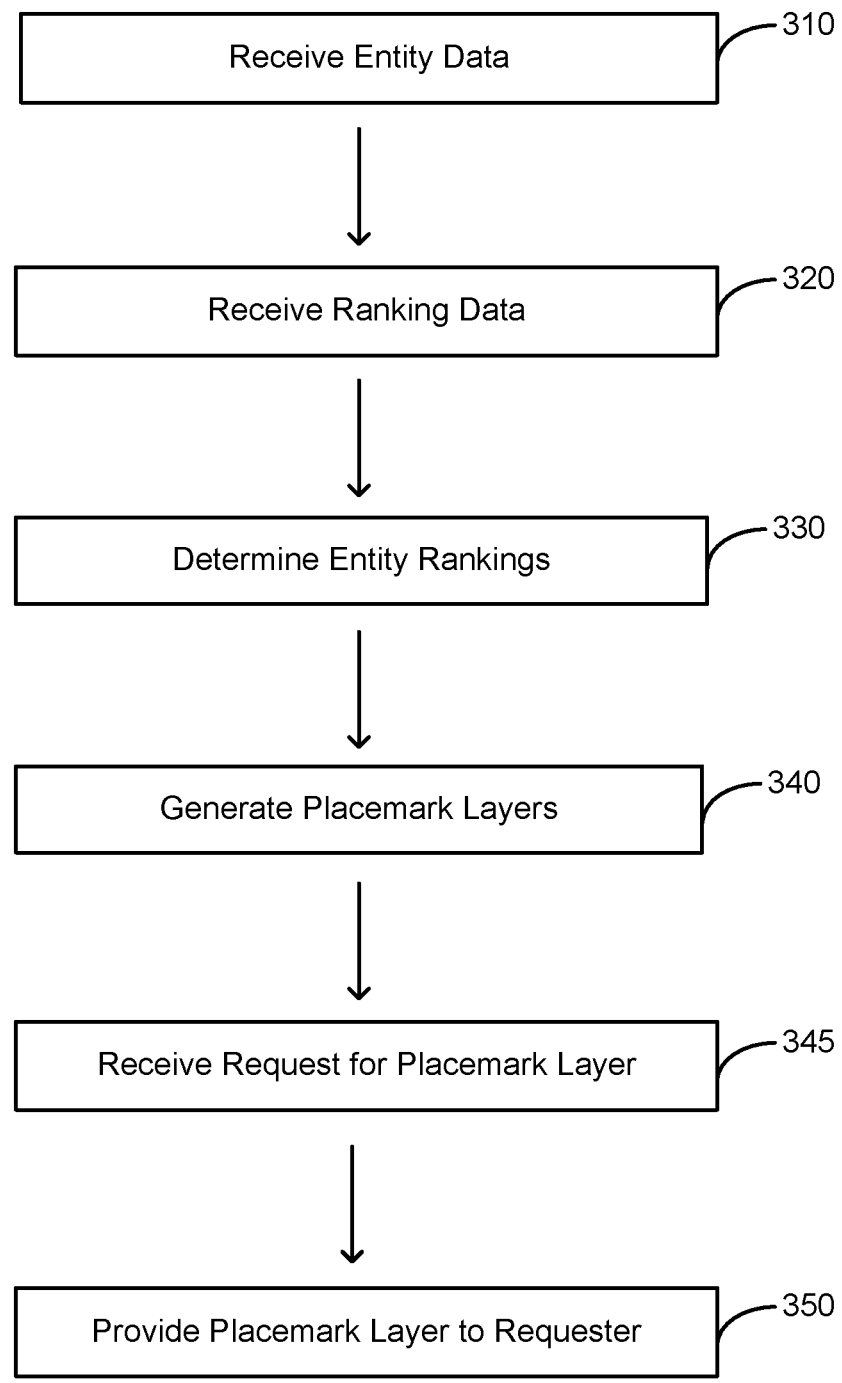
FIG. 3 illustrates a method for generating and providing prioritized entities in accordance with an embodiment of the invention.
Figure 4:
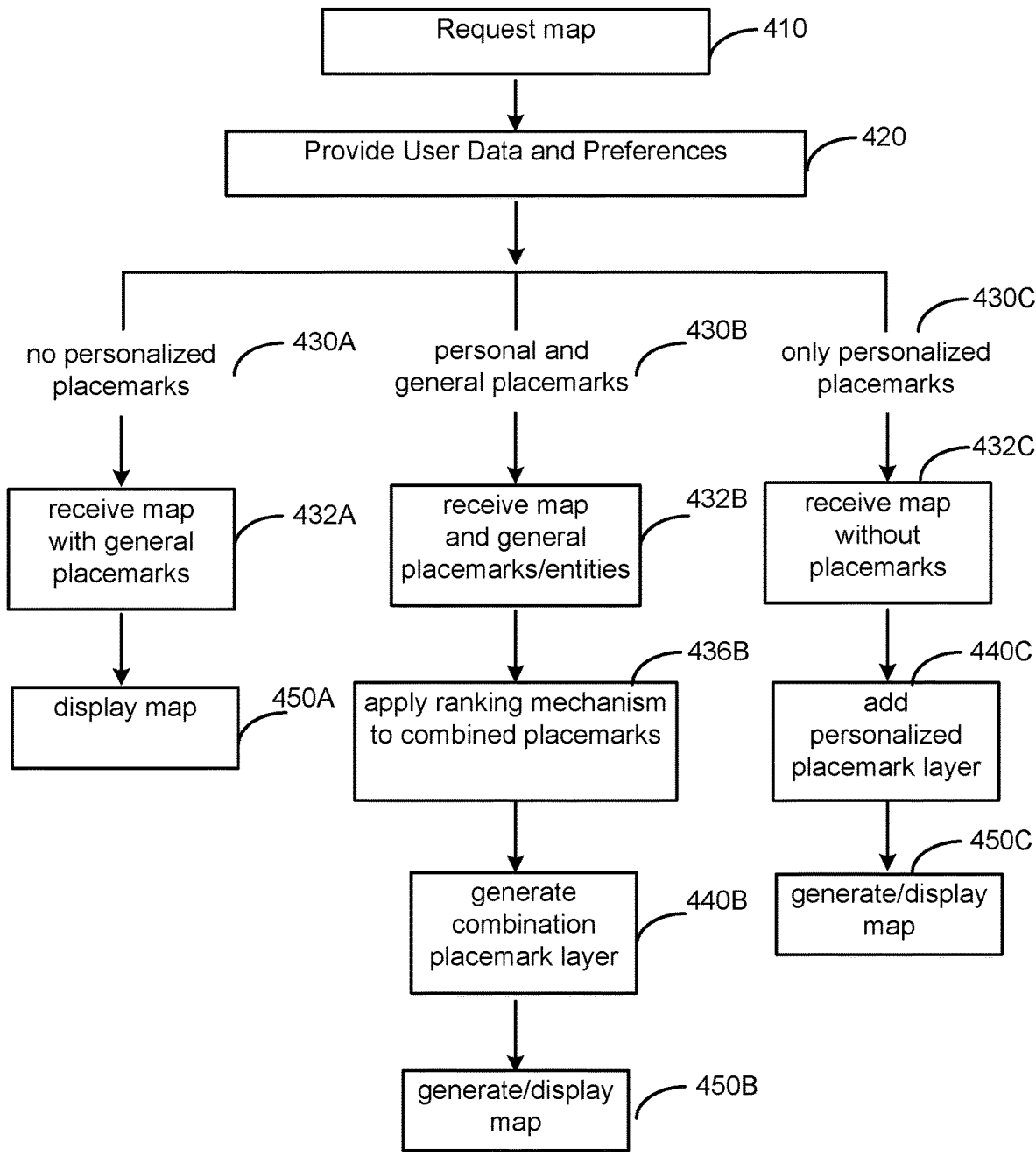
FIG. 4 illustrates a method for requesting and receiving a map including prioritized placemarks in accordance with an embodiment of the invention.

FIGS. 3 and 4 are flow charts illustrating steps performed to generate and serve ranked entity data in accordance with embodiments of the invention. Not every possible step is shown in the figures. In addition, some embodiments perform different steps in addition to, or instead of, the ones described herein. Furthermore, the order of the steps can vary from that described herein.

Generating Prioritized Placemarks for a Map

FIG. 3 illustrates a method for generating and providing prioritized entities in accordance with an embodiment of the invention. One or more steps may be performed by an entity ranking module such as the one depicted in FIG. 2 and implemented on the client and/or server side as shown in FIG. 1. In addition, while certain steps (for instance 350) are triggered by a user request for a map, others may be performed 'off-line' outside the context of a particular search request.

On a regular basis, entity data is received 310 from various sources such as the data sources discussed with reference to FIG. 1. Ranking data is also received 320, from the same or different sources as the entity data. The collection of data may take place, for instance, as part of a database construction process, or a web crawl and indexing process. Such data may also be pushed from vendors or third party sources. Some portions of the data, for instance, data about a user's personal placemarks, may be updated in real-time in response to a user request while others are received or refreshed according to a regular schedule. Various mechanisms such as those described above may be applied to the ranking data to determine 330 rankings or scores for the entities. Comparable attribute scores based on disparate types of ranking data obtained from various sources can be calculated using the techniques described above. The entity data may be stored in a database such as the one shown in FIG. 1, or in another embodiment, a subset of the ranked entity data is cached in a memory of a client hosting an entity ranking module that determines 330 entity rankings based on the cached data.

According to the example method shown in FIG. 3, ranked entity data is used to generate 340 layers of placemarks for display on maps. In an embodiment, the entities are mapped to placemarks, and stylings are applied based on the category in which an entity or placemark falls. Groups of placemarks are correlated to levels of detail in order to present a viewer of a map with an appropriate density of placemarks. The levels of detail may reflect any number of inputs, including the altitude at which a map is being viewed, the resolution of the map, other layers depicted on a given map, and user preferences about how sparse or dense a map should be. For instance, in an embodiment, if a placemark score is beyond a certain threshold, it receives a level 5 rating, meaning that map views at or below a certain altitude should include the placemark. The placemarks may also be organized into categories such that an individual placemark can be associated with different groups of placemarks, e.g. placemarks associated with a specific city as well as placemarks of tourist destinations. Each of these categories may be reflected a separate placemark layer.

In an embodiment, at a later point in time, a request for a placemark layer or layers is received 345, and the appropriate layers are provided 350 to the requester. As discussed earlier, a digital map may be generated according to raster, tiled, or vector-based methods. Depending on the method used, a placemark layer may be requested by a map server in real-time in response to a query, or provided 350 to create map components that are pre-stored and only served when a user request is received. In an embodiment, the placemark layers are provided 350 in response to user preferences or selections. In an embodiment, once provided, the placemark layer is combined with other layers to form a map, at a client or server site.

Requesting a Map with Prioritized Placemarks

Figure 5:
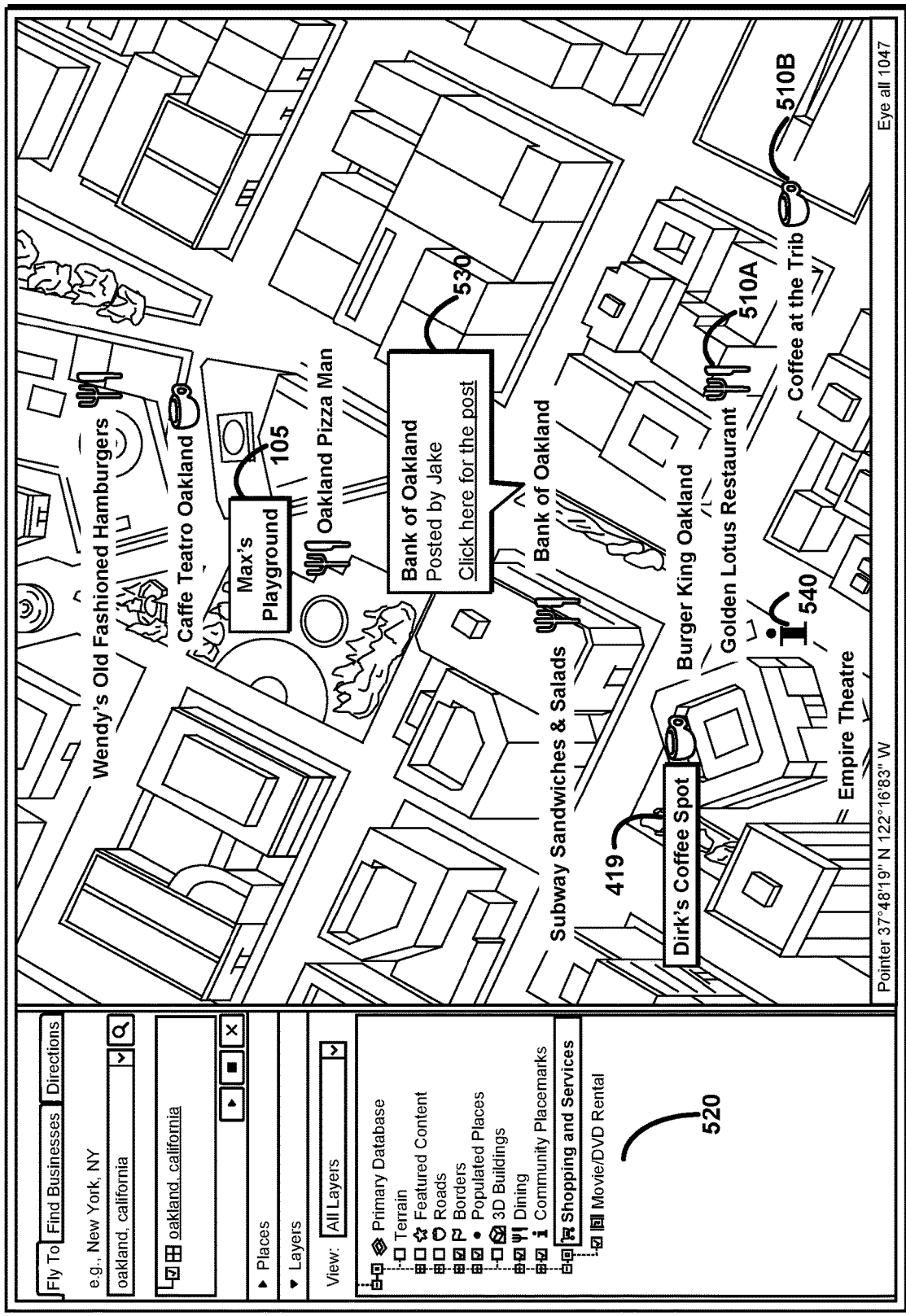
FIG. 5 depicts a GIS map that includes prioritized placemarks in accordance with an embodiment of the invention.

FIG. 4 is a flow chart illustrating steps for requesting and receiving a map including prioritized placemarks in accordance with an embodiment of the invention. FIG. 5. illustrates a map that could be received based on a request formulated using steps in the processes depicted in FIG. 4. One or more of these steps may be performed at a client requesting a map from a map server as shown in FIG. 1. The process begins when a map is requested 410 by a client, for instance from within a browser, specialized application such as Google Earth, or other software application. The map request identifies the geographic area for which the map is sought and the altitude the map should represent. User or client data and preferences are also provided 420 to a map server system. For instance, in an embodiment, the country from which the request originates, which can be determined based on the IP address of the request, for instance, and a user's language preferences are provided to a map server so that only placemarks in the appropriate language and which reflect country or culture-specific stylings or sources of data are served. The country and language information may be provided 420 from the requesting application or another source such as the operating system of the client.

In addition, user placemark preferences may also be provided 420 to the map system. The preferences may reflect for instance, which categories or layers of placemarks to display, how many placemark to include (density), and how much identifying information should be displayed on a map. For instance, in the case of the map of FIG. 5, a user can select, using checkboxes on a graphical user interface 520, which layers should be included on the map displayed 550. Each layer of placemarks is associated with its own icon or styling, for instance, a knife and fork icon 510A for a dining placemark, and a cup 510B for a drinking establishment.

In an embodiment, preferences provided 420 to the map system can be used to personalize the selection and display of placemarks to the user. Personalized placemark selection may be accomplished in a variety of ways, for instance by personalizing entity ranking by using a user's behavior or usage patterns as the basis of an attribute upon which an entity's rank is scored or varying the weight given to certain attributes based on a user's input; or, for example, by overriding generalized ranking schemes by always including placemarks that the user has defined or designated herself.

In the flow chart of FIG. 4, a requester may receive 432 various types of data depending on the personalization preferences provided to the map server system. However, as one of skill in the art would know, other steps reflecting different map generation and customization processes are also possible. In a default embodiment, there are no personalized placemarks 430A, and the client receives 432A and displays 450A a map with general placemarks. In such an embodiment, no entity ranking capabilities are implemented locally at the client. In another embodiment, however, a client requests that the requested map include only personalized placemarks 430C. In such an embodiment, entity ranking capabilities are implemented wholly at the client, with an entity ranking module such as the module described in FIG. 2 hosted locally rather than on a centralized server. The client receives 432A a map, comprised of map layers, which does not include any placemarks on it. Personalized placemarks generated and stored at the client are added 440A to the map, and the resulting map is generated and displayed for the user.

In yet another embodiment, the user may request a map that includes both personal and general placemarks 430. The client receives 432B a map and a group of general placemarks or entities associated with the geography of the map based on this request. The general placemarks are combined with personal placemarks that have been designated by the user in any of a variety of ways (for instance by authoring the entity definition or placing the placemark in a favorites folder), and a ranking mechanism is applied 436B to the combined group of placemarks. The results are used to generate 440B a layer that includes both personal and generalized placemarks, which is then combined with the map provided to the client to generate 450B a map for display 450B.

FIG. 5 shows an exemplary map including personal and general placemarks that has been generated in accordance with the method described at steps 412-420 and 430B through 450B. As is shown in FIG. 5, personal placemarks including Max's playground 105 and Dirk's coffee spot 419 are depicted together with dining (e.g. 510A) and drinking placemarks (e.g. 510B) on the map 550. Also provided are community placemarks which are demarcated with a special community placemark icon 540. The map 550 also includes interactive content, in the form of a text box 530 that links to a comment about a placemark provided by a community member. This allows a user to benefit from the input provided by other community members.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

The invention claimed is:

1. A computer-implemented method to provide personalized maps, the method comprising:

obtaining, by one or more computing devices, entity data that describes a plurality of geospatial entities, each geospatial entity having a geometry and located at a physical location;

receiving, by the one or more computing devices, an indication that a user has designated one or more of the plurality of geospatial entities as one or more favorite geospatial entities;

storing, by the one or more computing devices, user data that identifies the one or more favorite geospatial entities designated by the user;

receiving, by the one or more computing devices, a request for a map, the request associated with the user; and providing, by the one or more computing devices, the map for display to the user, wherein the map indicates the physical locations of at least one of the one or more favorite geospatial entities.

2. The computer-implemented method of claim 1, wherein the map indicates the physical locations of only geospatial entities that have been designated as favorite geospatial entities by the user.

3. The computer-implemented method of claim 1, wherein the map indicates the physical locations of geospatial entities that have been designated as favorite geospatial entities by the user and also indicates the physical locations of geospatial entities that have not been selected as favorite geospatial entities by the user.

4. The computer-implemented method of claim 1, further comprising:
ranking, by the one or more computing devices, at least a first portion of the plurality of geospatial entities according to a ranking mechanism, wherein geospatial entities that have been designated as favorite geospatial entities by the user are ranked higher than geospatial entities that have not been designated as favorite geospatial entities by the user; and
selecting, by the one or more computing devices, at least a second portion of the plurality of geospatial entities for inclusion in the map according to the ranking, wherein the map indicates the physical locations of each of the second portion of the plurality of geospatial entities.

5. The computer-implemented method of claim 4, wherein the map indicates the physical locations of geospatial entities that have been designated as favorite geospatial entities by the user and also indicates the physical locations of geospatial entities that have not been selected as favorite geospatial entities by the user.

6. The computer-implemented method of claim 4, wherein the second portion of the plurality of geospatial entities is a subset of the first portion of the plurality of geospatial entities.

7. The computer-implemented method of claim 1, further comprising:
ranking, by the one or more computing devices, at least a first portion of the plurality of geospatial entities according to a ranking mechanism; and
selecting, by the one or more computing devices, at least a second portion of the plurality of geospatial entities for inclusion in the map according to the ranking, wherein the map indicates the physical locations of each of the second portion of the plurality of geospatial entities, and wherein geospatial entities that have been designated as favorite geospatial entities by the user are selected for the second portion of the plurality of geospatial entities regardless of their respective ranking.

8. The computer-implemented method of claim 7, wherein the map indicates the physical locations of geospatial entities that have been designated as favorite geospatial entities by the user and also geospatial entities that have not been selected as favorite geospatial entities by the user.

9. The computer-implemented method of claim 1, further comprising:
ranking, by the one or more computing devices, at least a first portion of the plurality of geospatial entities into a plurality of layers, wherein the plurality of layers are respectively associated with a plurality of levels of detail, and wherein geospatial entities that have been designated as favorite geospatial entities by the user are ranked higher than geospatial entities that have not been designated as favorite geospatial entities by the user;
wherein providing, by the one or more computing devices, the map for display to the user comprises:
determining, by the one or more computing devices, a current level of detail associated with the request for the map; and
providing, by the one or more computing devices, the map for display to the user, wherein the map indicates the physical locations of geospatial entities included in the layer associated with the current level of detail.

10. A computer system for providing personalized maps, the system comprising:
one or more processors; and
one or more tangible, non-transitory, computer-readable storage media that store instructions that, when executed by the one or more processors, cause the computer system to perform operations, the operations comprising:
obtaining entity data that describes a plurality of geospatial entities, each geospatial entity having a geometry and located at a physical location;
receiving an indication that a user has designated one or more of the plurality of geospatial entities as one or more favorite geospatial entities;
storing user data that identifies the one or more favorite geospatial entities designated by the user;
receiving a request for a map, the request associated with the user; and
providing the map for display to the user, wherein the map indicates the physical locations of at least one of the one or more favorite geospatial entities.

11. The computer system of claim 10, wherein the map indicates the physical locations of only geospatial entities that have been designated as favorite geospatial entities by the user.

12. The computer system of claim 10, wherein the map indicates the physical locations of geospatial entities that have been designated as favorite geospatial entities by the user and also indicates the physical locations of geospatial entities that have not been selected as favorite geospatial entities by the user.

13. The computer system of claim 10, wherein the operations further comprise:
ranking at least a first portion of the plurality of geospatial entities according to a ranking mechanism, wherein geospatial entities that have been designated as favorite geospatial entities by the user are ranked higher than geospatial entities that have not been designated as favorite geospatial entities by the user; and
selecting at least a second portion of the plurality of geospatial entities for inclusion in the map according to the ranking, wherein the map indicates the physical locations of each of the second portion of the plurality of geospatial entities.

14. The computer system of claim 13, wherein the map indicates the physical locations of geospatial entities that have been designated as favorite geospatial entities by the user and also indicates the physical locations of geospatial entities that have not been selected as favorite geospatial entities by the user.

15. The computer system of claim 13, wherein the second portion of the plurality of geospatial entities is a subset of the first portion of the plurality of geospatial entities.

16. The computer system of claim 10, wherein the operations further comprise:
ranking at least a first portion of the plurality of geospatial entities according to a ranking mechanism; and selecting at least a second portion of the plurality of geospatial entities for inclusion in the map according to the ranking, wherein the map indicates the physical locations of each of the second portion of the plurality of geospatial entities, and wherein geospatial entities that have been designated as favorite geospatial entities by the user are selected for the second portion of the plurality of geospatial entities regardless of their respective ranking.

17. One or more tangible, non-transitory, computer-readable storage media that collectively store instructions that, when executed by one or more processors, cause the one or more processors to perform operations, the operations comprising:

receiving a request for a map, the request associated with a user;

obtaining user data that identifies at least one geospatial entity designated by the user as a favorite geospatial entity;

identifying a plurality of geospatial entities that can be included in the map;

ranking at least a first portion of the geospatial entities according to a ranking mechanism;

selecting at least a second portion of the geospatial entities to be included in the map according to the ranking, wherein the at least one geospatial entity designated by the user as the favorite geospatial entity is included in the second portion of the geospatial entities; and providing the map for display to the user, wherein the map indicates a physical location of each of the second portion of the geospatial entities.

18. The one or more tangible, non-transitory, computer-readable storage media of claim 17, wherein ranking at least the first portion of the geospatial entities according to the ranking mechanism comprises crediting a rank bonus to the at least one favorite geospatial entity, wherein the rank bonus increases the ranking of the at least one favorite geospatial entity.

19. The one or more tangible, non-transitory, computer-readable storage media of claim 17, wherein selecting at least the second portion of the geospatial entities to be included in the map comprises selecting the at least one favorite geospatial entity to be included in the map regardless of the ranking of the at least one favorite geospatial entity.

20. The one or more tangible, non-transitory, computer-readable storage media of claim 17, wherein selecting at least the second portion of the geospatial entities to be included in the map comprises overriding a generalized ranking scheme to include the at least one favorite geospatial entity.

* * * * *